US011150544B2

(12) United States Patent
Kahle et al.

(10) Patent No.: US 11,150,544 B2
(45) Date of Patent: Oct. 19, 2021

(54) AUTOMATIC MICROFORM CARRIER SYSTEMS AND METHODS

(71) Applicant: e-ImageData Corp., Hartford, WI (US)

(72) Inventors: Todd Kahle, Hartford, WI (US); Grant Taylor, Harvard, MA (US)

(73) Assignee: e-ImageData Corp., Hartford, WI (US)

( * ) Notice: Subject to any disclaimer, the term of this patent is extended or adjusted under 35 U.S.C. 154(b) by 364 days.

(21) Appl. No.: 16/393,170

(22) Filed: Apr. 24, 2019

(65) Prior Publication Data

US 2019/0324354 A1  Oct. 24, 2019

Related U.S. Application Data

(60) Provisional application No. 62/661,977, filed on Apr. 24, 2018.

(51) Int. Cl.
| | |
|---|---|
| G03B 21/11 | (2006.01) |
| G03B 27/53 | (2006.01) |
| H04N 1/00 | (2006.01) |
| H04N 1/028 | (2006.01) |
| H04N 1/195 | (2006.01) |
| G02B 7/09 | (2021.01) |
| G03B 27/34 | (2006.01) |
| H04N 1/024 | (2006.01) |
| G02B 7/182 | (2021.01) |
| G03B 17/02 | (2021.01) |
| G02B 7/18 | (2021.01) |
| G03B 11/02 | (2021.01) |

(52) U.S. Cl.
CPC .............. *G03B 21/115* (2013.01); *G02B 7/09* (2013.01); *G02B 7/182* (2013.01); *G03B 17/02* (2013.01); *G03B 27/34* (2013.01); *G03B 27/53* (2013.01); *H04N 1/00267* (2013.01); *H04N 1/0288* (2013.01); *H04N 1/02409* (2013.01); *H04N 1/19589* (2013.01); *H04N 2201/041* (2013.01)

(58) Field of Classification Search
None
See application file for complete search history.

(56) References Cited

U.S. PATENT DOCUMENTS

| 3,421,818 A * | 1/1969 | Roberts ................... G03G 15/30 355/42 |
| 2016/0321514 A1* | 11/2016 | Kahle .................... G06K 9/183 |

OTHER PUBLICATIONS

E-Image Data, ScanPro 1000, All-In-One Microfilm Viewer, Scanner-to-PC, Printer, The Complete Digital Solution, Brochure, May 9, 2006, 2 pages.

(Continued)

*Primary Examiner* — Michelle M Iacoletti
*Assistant Examiner* — Danell L Owens
(74) *Attorney, Agent, or Firm* — Quarles & Brady LLP

(57) ABSTRACT

A digital microform imaging apparatus includes a bracket movably coupled to a chassis. A microform media support is coupled to the bracket and includes a frame and a window supported by the frame. An illumination source is provided to direct light through the window of the microform media support along an optical axis. An optical sensor is positioned along the optical axis. A motor is operatively engaged with the microform media support to move the bracket and frame relative to the chassis along an axis perpendicular to the optical axis.

81 Claims, 28 Drawing Sheets

(56) References Cited

OTHER PUBLICATIONS

Nextscan, "Flexscan Automatic Microfiche Scanner," accessed on Apr. 17, 2019, 4 pages, URL <http://www.nextscan.com/flexscan-microfiche-scanner/>.
SMA, "Automatic Fiche Scanning Made Affordable!" accessed on Apr. 17, 2019, 3 pages, URL <https://www.sma-edocument.com/products/Products/5/mfs-1.html>.
Sunrise, "SunRise MicroFiche Scanners," accessed on Apr. 17, 2019, 2 pages, URL <http://www.sunriseimaging.com/products-download/fiche-brochure-asize.pdf>.
Crowley, "Microfiche Scanners with Superior Speed and Image Quality," accessed on Apr. 17, 2019, 5 pages, URL<https://www.thecrowleycompany.com/scanners-software/product-brands/mekel-technology/microfiche-scanners/>.
Staude Imaging, "multi-fly Automatic scanning of all kinds of microfches," accessed on Apr. 17, 2019, 2 pages, URL <http://www.staude-imaging.de/index.php/en/scanner/film-scanner/multi-fly-2-us>.

* cited by examiner

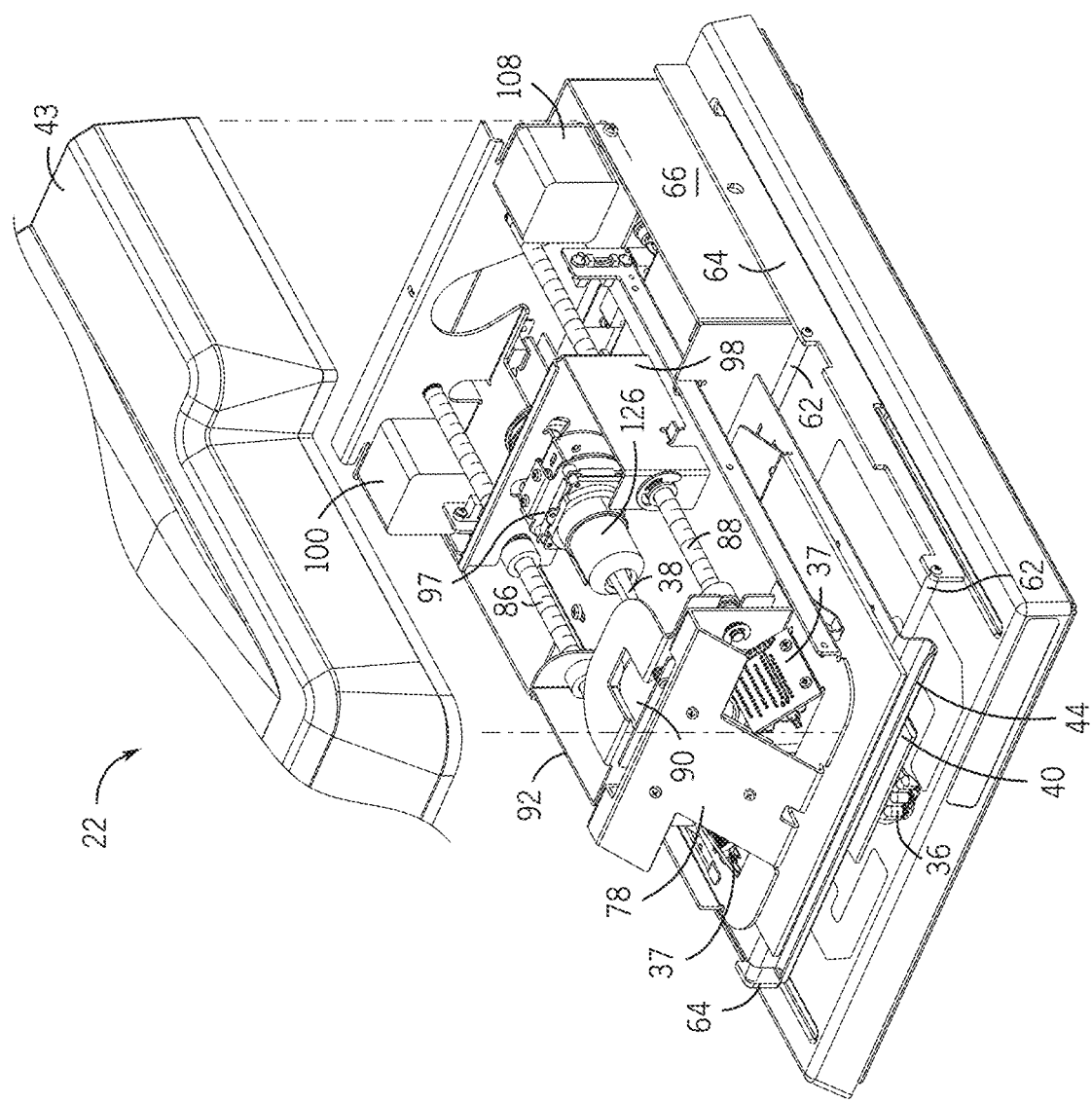

AUTOMATIC MICROFORM CARRIER SYSTEMS AND METHODS

CROSS-REFERENCE TO RELATED APPLICATIONS

This patent application claims the benefit of priority of U.S. Provisional Patent Application No. 62/661,977, filed Apr. 24, 2018, and entitled "AUTOMATIC MICROFORM CARRIER SYSTEMS AND METHODS," the entirety of which is hereby incorporated by reference.

STATEMENT REGARDING FEDERALLY SPONSORED RESEARCH

Not Applicable.

FIELD OF THE INVENTION

The present invention relates generally to using a digital microform imaging apparatus for viewing a microform containing an image of a document, and more particularly to systems and methods for automatically controlling a digital microform imaging apparatus.

BACKGROUND OF THE INVENTION

Microforms are useful in archiving a variety of documents or records by photographically reducing and recording the document in a film format. Examples of typical microform image formats include microfiche, ultra-fiche, aperture cards, jacketed microfiche, 16 mm or 35 mm open spool roll film, 16 mm cartridge roll film, both positive and negative, and micro opaque cards. Microfiche is a known microform wherein a large number of documents (up to a thousand pages or more, for example) are photographically reduced and formed in an equally-spaced orthogonal array of rows and columns onto a single "card" of film (such as a card of 3×5 inches to 4×6 inches, for example). The microfiche may then be placed in a microform reader/scanner/printer device whereby a desired document image is located and presented on a display screen. For almost 100 years, documents such as newspapers and other print media, business records, government records, health records, genealogical records, and the like have been recorded on microforms and are still being recorded in this way today.

The orthogonal array of document images on microfiche film are generally ordered numerically or chronologically, although any arrangement is possible. In one scenario where a microfiche card is used, a user may desire to view, scan, or print only one, or just a few, of the documents on the microfiche. Finding the desired document(s) can represent a significant challenge of using microfiche. Once the microfiche is placed into the film carrier of the microform reader/scanner printer, a user could search for the desired document by moving the film carrier slowly while viewing pertinent information, such as numbers or dates on every document. However, to read this information, the film carrier must be moved very slowly. Using this method to find the one document among the possible hundreds or thousands would take a very long time. To speed up the search process, the user can employ a trial and error approach, using quick movements, moving across the microfiche, and stopping to read page numbers or dates to eventually find the desired document. Even the most experienced user wastes a great deal of time finding a desired document in this way. In another scenario, a user may desire to view/scan/print all of the document images on the microfiche. In this case, the user must perform the tedious task of moving the film carrier of the microform reader/scanner/printer into position for each image. This can take even longer than locating just a few images on a microfiche card.

What is needed in the art is improved systems and methods for locating, viewing, scanning and/or printing images on microform media.

SUMMARY OF THE INVENTION

The present invention provides systems and methods for automatically scanning and/or printing images of a document on microforms.

In some embodiments, a digital microform imaging apparatus is provided. The digital microform imaging apparatus includes a bracket movably coupled to a chassis. A microform media support is coupled to the bracket and includes a frame and a window supported by the frame. An illumination source is provided to direct light through the window of the microform media support along an optical axis. An optical sensor is positioned along the optical axis. A motor is operatively engaged with the microform media support to move the bracket and frame relative to the chassis along an axis perpendicular to the optical axis.

In some embodiments, a digital microform imaging apparatus is provided. The apparatus includes a microform media support having a window extending perpendicular to an optical axis defined by an illumination source. The microform media support is axially movable in at least two directions perpendicular to the optical axis. The microform media support is operatively coupled to a first motor and a second motor. The first motor and the second motor are configured to move the microform media support axially in the at least two directions perpendicular to the optical axis.

In some embodiments, a digital microform imaging apparatus is disclosed. The apparatus includes an illumination source, an optical sensor, and a motorized microform transport device coupled to a microform media support. The motorized microform transport device includes a housing defining a cavity and a carriage received within the cavity. A first motor is coupled to the carriage and is operatively coupled to a lead screw to rotate the lead screw about a longitudinal axis and drive the microform media support along an axis parallel to the longitudinal axis. A second motor is coupled to the carriage and is operatively coupled to a gear within the cavity. The gear is configured to drive the carriage relative to the digital microform imaging apparatus in a direction perpendicular to the longitudinal axis.

A motorized microform transport device for a digital microform imaging apparatus is also disclosed. The device includes a housing defining a cavity and a carriage received within the cavity. A first motor is coupled to the carriage and is operatively coupled to a lead screw to rotate the lead screw about a longitudinal axis. A second motor is coupled to the carriage and is operatively coupled to a gear within the cavity. The gear is configured to drive the housing relative to the digital microform imaging apparatus in a direction perpendicular to the longitudinal axis.

These and other benefits may become clearer upon making a thorough review and study of the following detailed description. Further, while the embodiments discussed above can be listed as individual embodiments, it is to be understood that the above embodiments, including all elements contained therein, can be combined in whole or in part.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2A is an fragmentary, exploded perspective view of the digital microform imaging apparatus used with the system of FIG. 1;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE EMBODIMENTS

Figure 1:
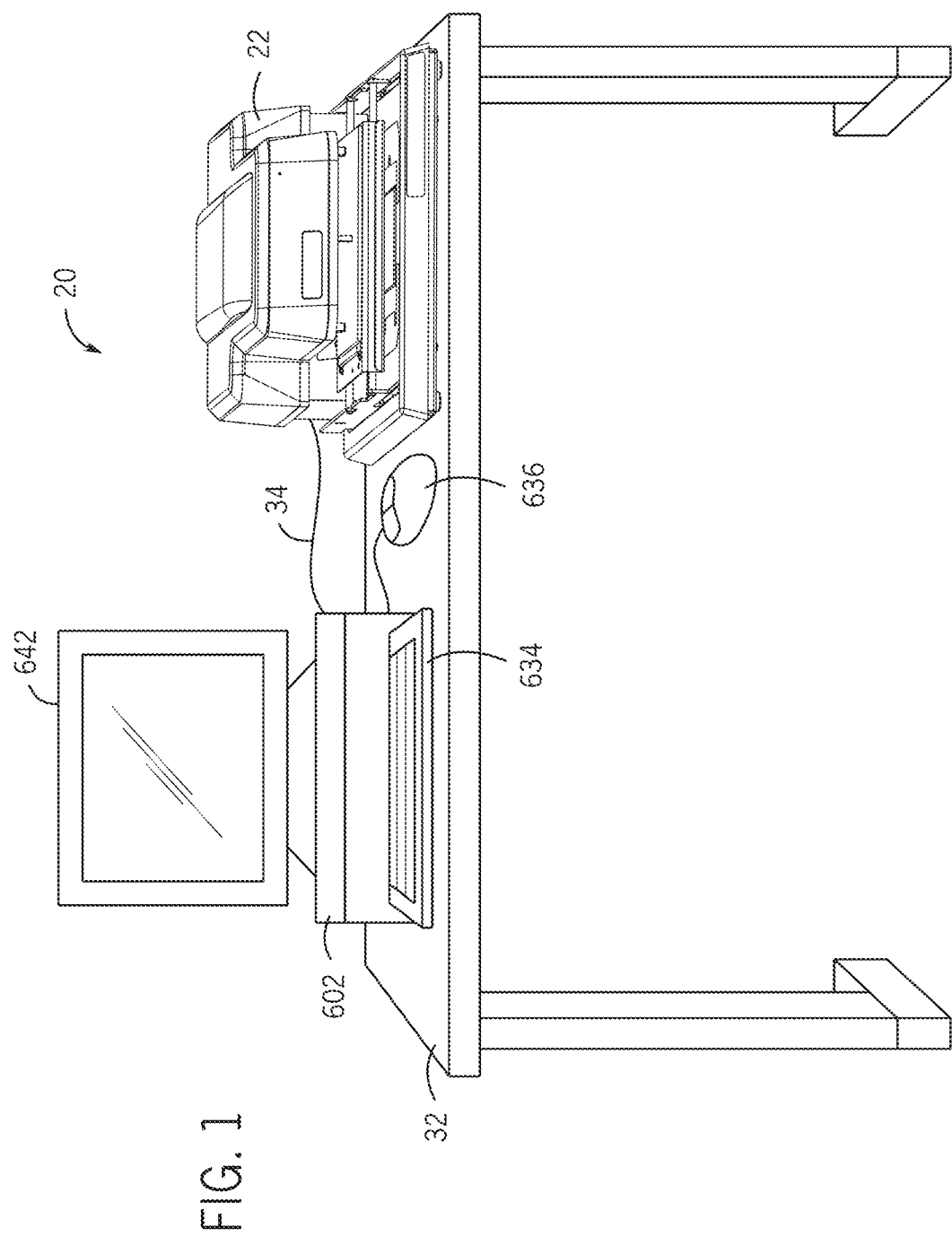
FIG. 1 is a perspective view of an embodiment of a digital microform imaging system according to the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Referring now to the drawings, and more particularly to FIG. 1, there is shown a digital microform imaging system 20 which generally includes digital microform imaging apparatus (DMIA) 22 connected to a computer 602. Computer 602 can include one or more displays 642, and user input devices such as a keyboard 634 and mouse 636. DMIA 22 and computer 602 can be placed on a work surface 32 of a desk, or other work surfaces, for convenient access and ease of use. DMIA 22 can be electrically connected to computer 602 via cable 34, which may provide communication using a FireWire IEEE 1394 standard, for example. Although cable 34 is described as an electrical type cable, alternatively DMIA 22 and computer 602 can communicate via fiber optics, or wirelessly through infrared or radio frequencies, for example. Other details of computer 602 and the general computing environment are discussed in more detail below and shown in FIG. 9. DMIA 22 is described in U.S. Pat. No. 8,269,890, titled "DIGITAL MICROFORM IMAGING APPARATUS", filed May 15, 2007, which application is incorporated by reference as if fully set forth herein.

Referring more particularly to FIGS. 2A-4, DMIA 22 includes an approximately monochromatic illumination source 36, such as a light emitting diode (LED) array or other monochromatic illumination source, transmitting an incident light 38 through a diffuse window 40 along a first optical axis 42 of apparatus 22. Light emitting diode (LED) array 36 can be an approximately 13×9 array of individual LEDs operating in the 495-505 nm wavelength region, although array 36 is not limited to such parameters. The relatively monochromatic nature of source 36 helps reduce chromatic aberration in DMIA 22, thereby improving the optical resolution of the images produced. Diffuse window 40 can be a frosted glass which diffuses the light emanating from array 36, thereby creating a more uniform illumination source. DMIA 22 can include cover 43 to help protect the inner elements of DMIA 22.

Figure 2B:
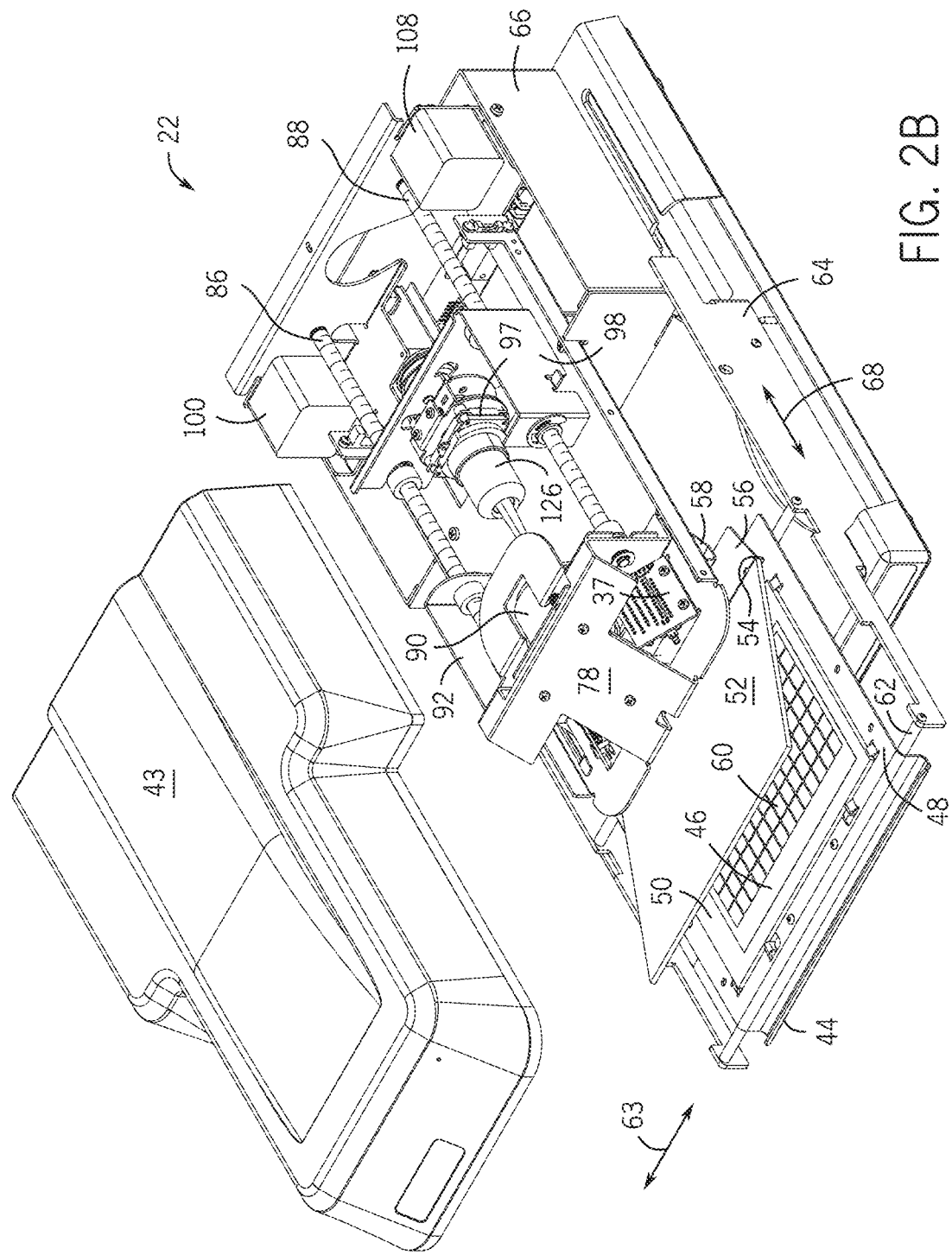
FIG. 2B is an exploded, fragmentary, perspective view of the digital microform imaging apparatus of FIG. 2A, illustrating particularly the X-Z table mobility.

A microform media support 44 is configured to support a microform media 46 after diffuse window 40 and along first optical axis 42. In the embodiment shown support 44 is an X-Z table, that is, support 44 is movable in a plane which is approximately orthogonal to first optical axis 42. Referring particularly to FIGS. 2A and 2B, microform media support 44 includes frame 48 which supports first window 50 on one side of microform media 46, and second window 52 on the other side of microform media 46. Second window 52 hinges upward at 54 when frame 48 is moved forward to the extent that lever 56 (connected to second window 52) contacts ramps 58 (one ramp on either side), and similarly, hinges downward at 54 when frame 48 is moved rearward as lever 56 is released from contact with ramp 58. In this way the microform media 46, shown as a microfiche film with an array of images or microform segments 60, can be placed and held securely between windows 50, 52 for viewing. Frame 48, along with windows 50, 52 and media 46, are slidingly supported on rods 62 by bearings (not shown) to allow a transverse movement 63 of frame 48, windows 50, 52 and media 46. Rods 62 are connected to brackets 64, which brackets are slidingly supported by chassis 66 and bearings (not shown) to allow a longitudinal movement 68 of frame 48, windows 50, 52, media 46 and rods 62.

Figure 3:
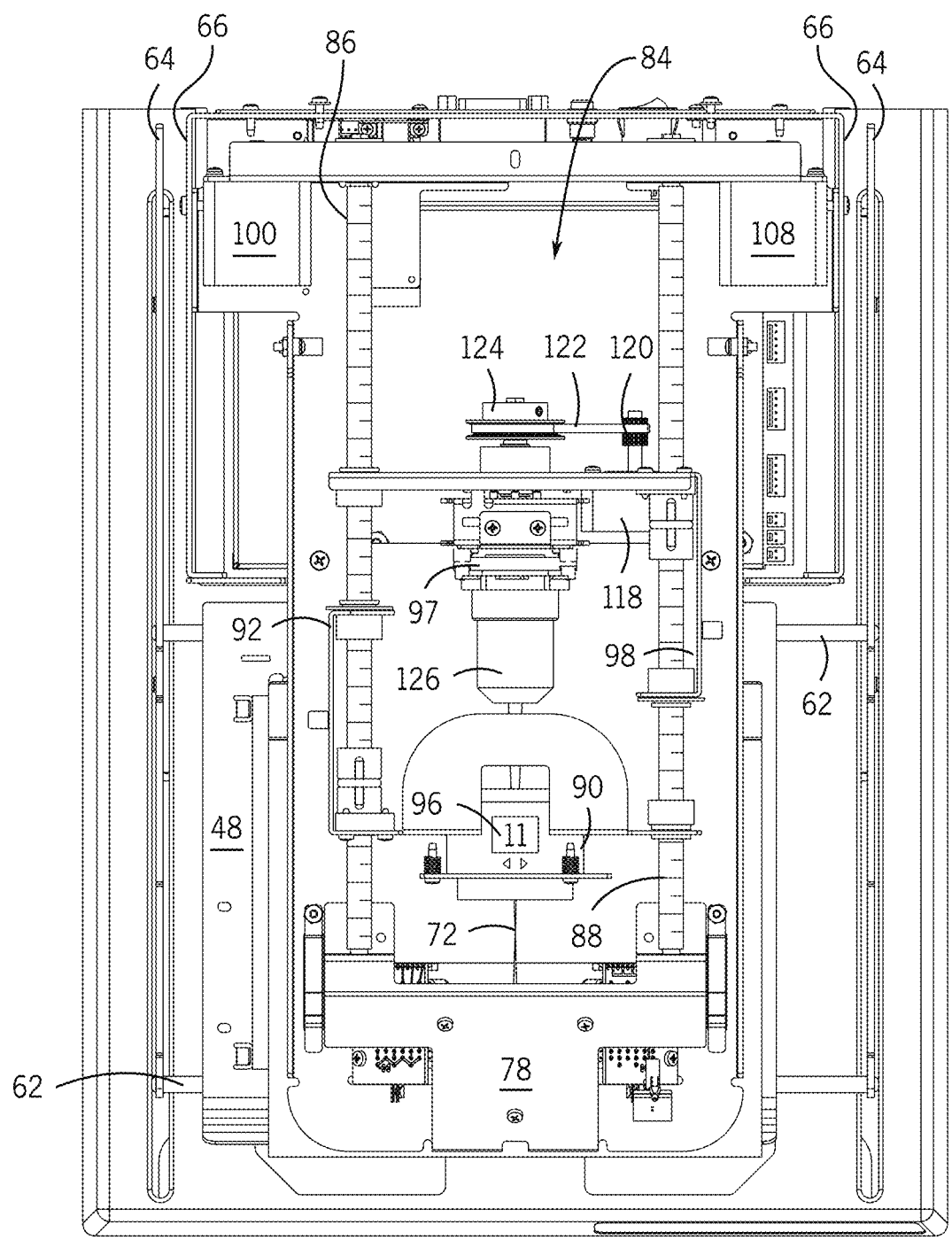
FIG. 3 is a top view of the digital microform imaging apparatus of FIG. 2A.
Figure 4:
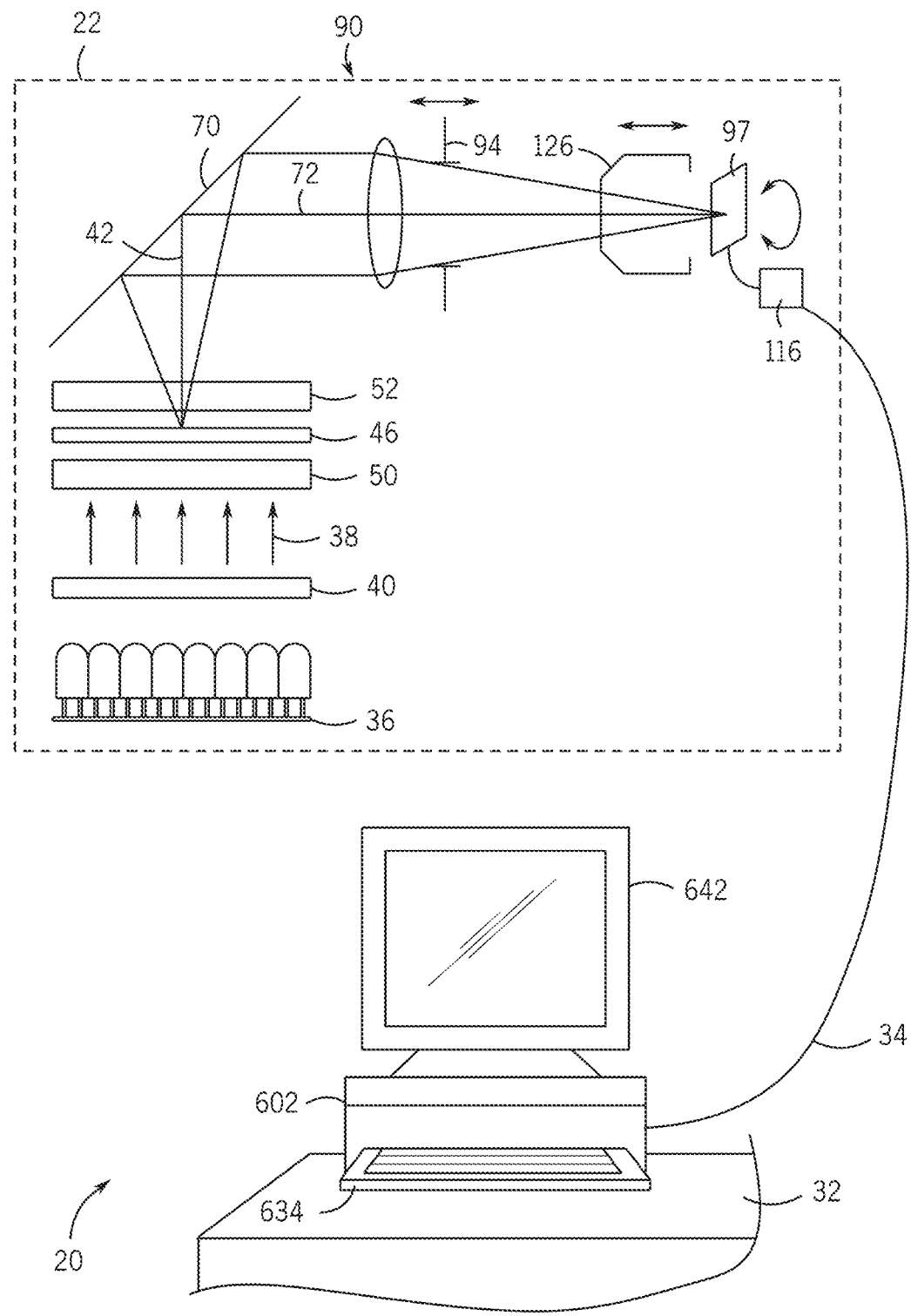
FIG. 4 is a schematic view of the digital microform imaging system of FIG. 1.

Referring to FIGS. 3 and 4, an approximately 45 degree fold mirror 70 reflects the incident light transmitted through microform media 46 approximately 90 degree along a second optical axis 72. First optical axis 42 and second optical axis 72 can be thought of as segments of the single or main optical axis. Mirror 70 is connected by a three point mount to mirror mount 78 by fasteners and springs. Mirror mount 78 is connected to chassis 66 as shown. Fold mirror 70 advantageously shortens the overall longitudinal length of the optical axis which allows DMIA 22 to be more compact.

An imaging subsystem 84 includes a first lead screw 86 and a second lead screw 88 where each lead screw is approximately parallel with second optical axis 72. A lens 90 is connected to a first carriage 92 which is linearly adjustable by rotating first lead screw 86. Lens 90 includes stop 94 and f-stop adjustment 96 which can adjust the aperture of stop 94. Lens 90 can have a fixed focal length of 50 mm, for example. This focal length has the advantage of a relatively large depth of focus. A rough formula used to quickly calculate depth of focus is the product of the focal length times the f-stop divided by 1000, which yields a depth of focus of 0.55 mm for a 50 mm focal length and f11 f-stop adjustment. An optical sensor, i.e., area sensor 97 is connected to a second carriage 98 which carriage is linearly adjustable by rotating second lead screw 88. Area sensor 97 can be an area array CCD sensor with a two dimensional array of sensor elements or pixels, for example, with a 3.5 $\mu m^2$ pixel size, or other types of sensors and pixel sizes depending on resolution size requirements. The area array nature of sensor 97, when compared to a line sensor, eliminates the need for scanning of the sensor when viewing two dimensional images. The overall novel optical layout of the present invention including the separately adjustable area sensor 97 and lens 90; 45 degree fold mirror 70; and film table 44 location; algorithms for moving the lens and sensor to appropriate respective locations to achieve proper magnification and focus of the image; and the lens focal length and relatively large depth of focus, allows DMIA 22 to autofocus without the need for iterative measurements and refocusing of the lens 90 during magnification changes to accommodate different reduction ratios of different film media. Further, the embodiments can easily accommodate reduction ratios in the range of 7× to 54×, although the present invention is not limited to such a range.

A first motor 100 is rotationally coupled to first lead screw 86 by a timing pulley 120, a belt 122 with teeth, and another timing pulley 124 and a second motor 108 is rotationally coupled to second lead screw 88 by a timing pulley, a belt with teeth, and another timing pulley, similar to timing pulley 120, belt 122 with teeth, and timing pulley 124, respectively. A controller 116 is electrically connected to first motor 100, second motor 108 and area sensor 97, where controller 116 is for receiving commands and other inputs from computer 24 or other input devices, controlling first motor 100 and second motor 108, and other elements of DMIA 22, and for outputting an image data of area sensor 97. Consequently, controller 116 can include one or more circuit boards which have a microprocessor, field programmable gate array, application specific integrated circuit or other programmable devices; motor controls; a receiver; a transmitter; connectors; wire interconnections including ribbon wire and wiring harnesses; a power supply; and other electrical components. Controller 116 also provides electrical energy and lighting controls for LED array 36.

A third motor 118 is rotationally coupled to area sensor 97, where controller 116 additionally controls third motor 118 through electrical connections as with motors 100 and 108. For example, controller 116 can rotate area sensor 97, using motor 118, timing pulley 120, belt 122 with teeth, and timing pulley 124, to match an aspect ratio of microform media 46, and particularly an aspect ratio of images 60. A light baffle 126 can be connected to area sensor 97 to reduce stray light incident on sensor 97 and thereby further improve the resolution and signal to noise of DMIA 22. Light baffle 126 can have an antireflective coating at the front and inside surfaces of the baffle to further reduce stray light incident on sensor 97. Motors 100, 108 and 118 can be DC servomotors, or other motors.

Figure 5:
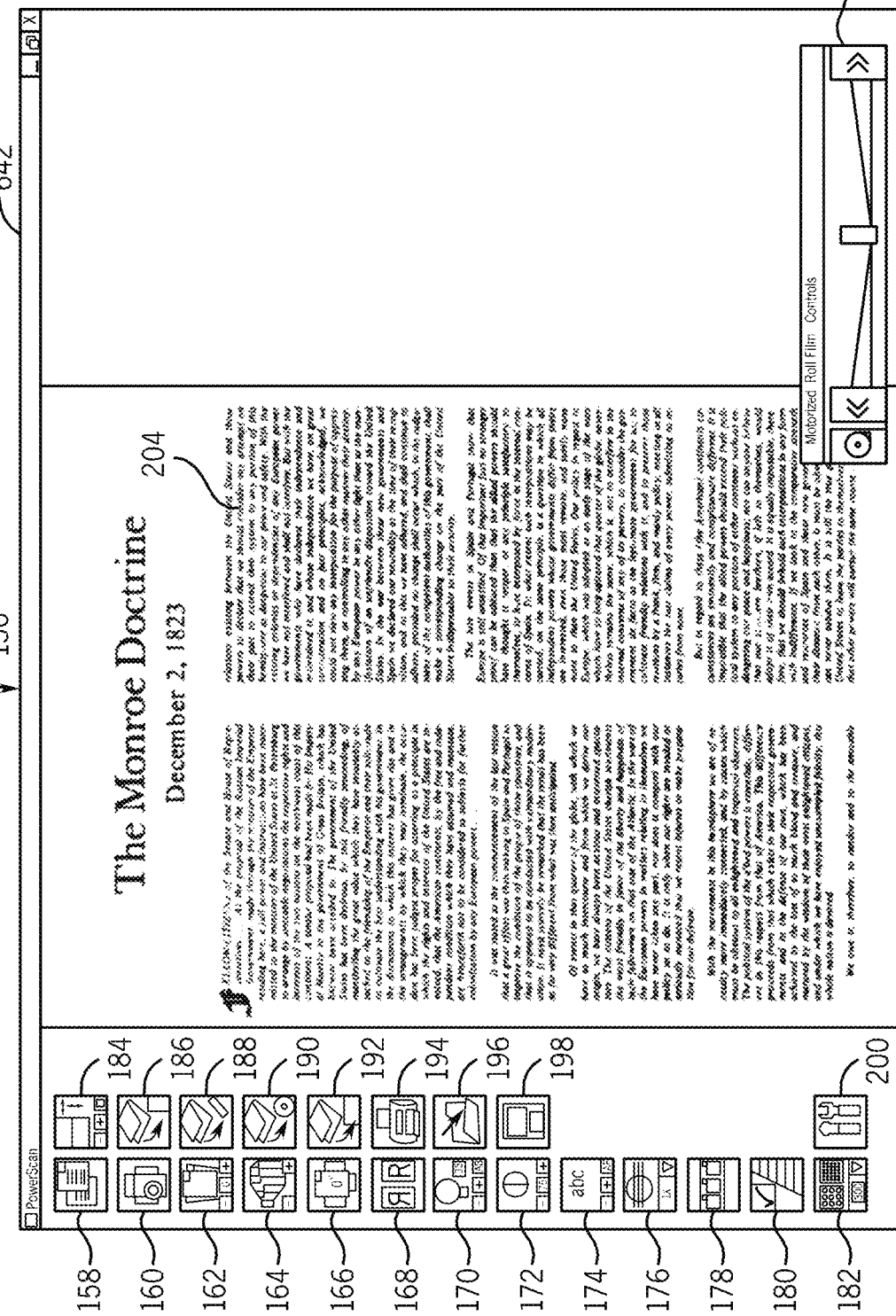
FIG. 5 is a screen shot of an embodiment of a computer user interface of the digital microform imaging system of FIG. 1, including image data.

Referring to FIG. 5, computer 602 includes a software computer user interface (CUI) 156 displayed by monitor 642 with user inputs to control DMIA 22 in general, and particularly, illumination system 36, motors 100, 108 and 118, and other elements of DMIA 22. CUI 156 can be in the form of at least one instruction executed by the at least one processor 604, where the instructions of CUI 156 are stored on computer-readable storage medium such as any number of program modules stored on hard disk 616, magnetic disk 620, optical disk 624, ROM 612, and/or RAM 610, or other computer-readable storage medium. CUI 156 generally includes a display area 157 and a toolbar 159 with user selectable controls as follows. Toolbar 159 or other dialog boxes can include various software user input buttons, including but not limited to: positive/negative film type 158; landscape/portrait film orientation 160; rotate optical 162 for rotating third motor 118; optical zoom 164 which controls first motor 100 and second motor 108; digital image rotation 166; mirror image 168 for adjusting for when media 46 is placed on support 44 upside down; brightness 170 which adjusts the speed of sensor 97; contrast 172; focus 174 with manual focus (−/+) and autofocus (AF), also controlling first motor 100; digital magnifier 176; live button 178; scan type/selecting grayscale, grayscale enhanced, halftone 180; resolution/image capture 182; scan size button for prints/fit to page 184; save image scan to computer drive #1 186; save image scan to computer drive #2 188; save image scan to computer drive #3 190; save image scan to email 192; print image 194; restore settings 196; save settings 198; setup/tools 200; and motorized roll film controls 202 for embodiments with motorized roll film attachments. These controls of toolbar 159 can be selected by a user with a left click of mouse 636. Other toolbar or dialog box input selections are contemplated.

Figure 6:
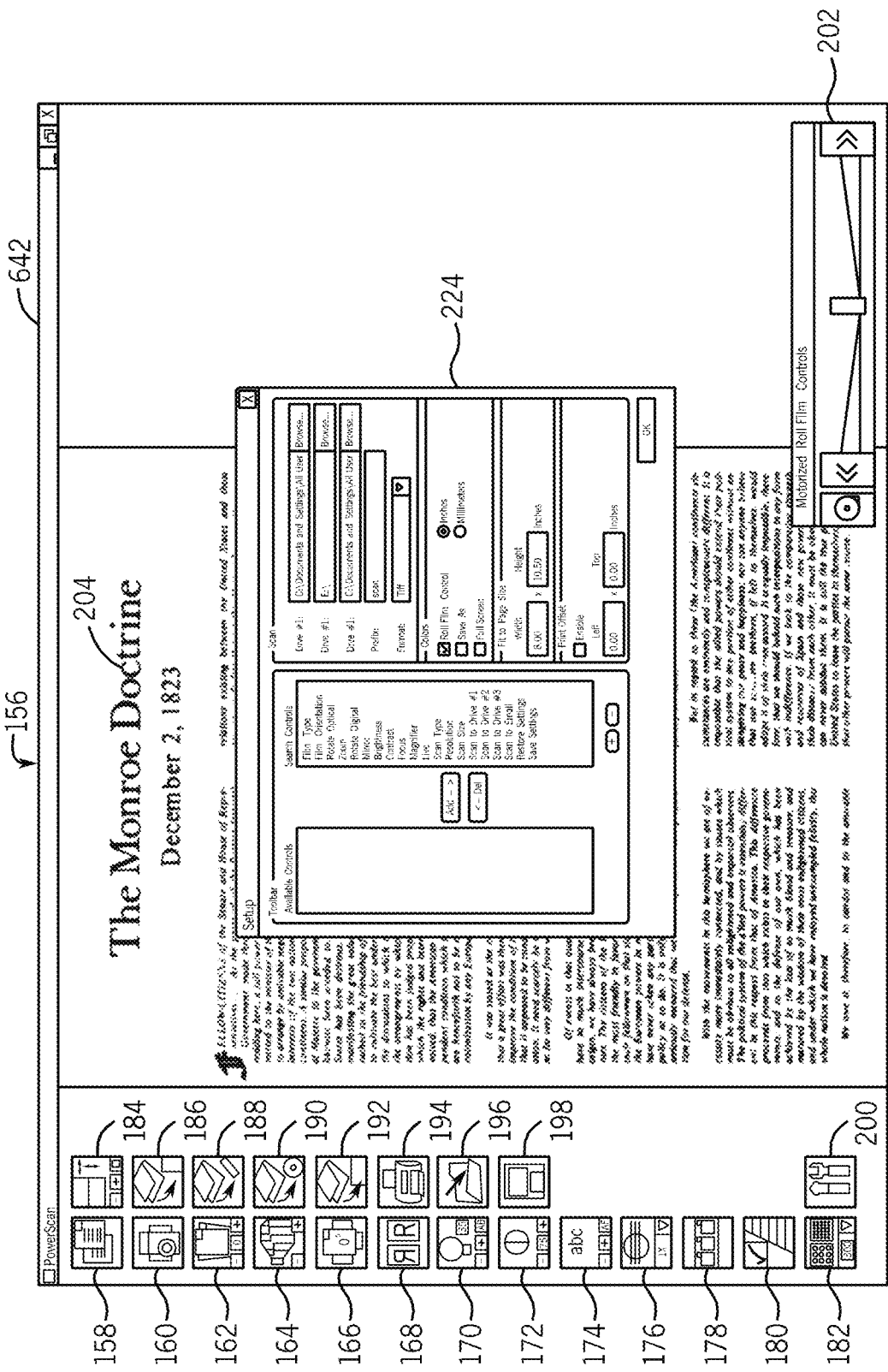
FIG. 6 is a screen shot similar to FIG. 5, but also including a setup dialog box.

FIG. 6 illustrates the configurable nature of CUI 156, and more particularly toolbar 159. Selecting setup/tools 200 opens dialog box 224. Toolbar controls and other parameters are added, deleted and/or changed as shown by dialog box 224.

Figure 7:
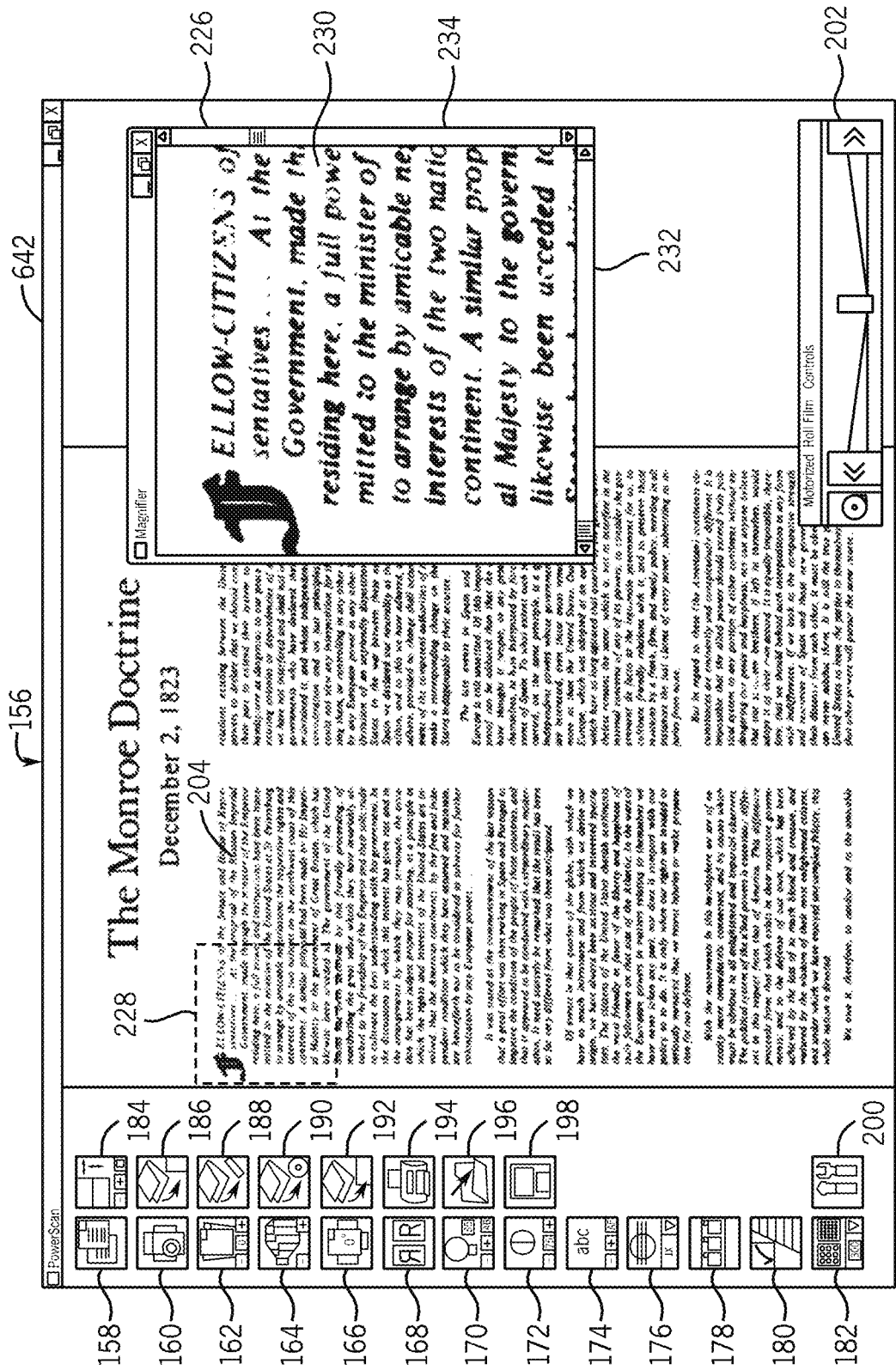
FIG. 7 is a screen shot similar to FIG. 5, but also including a digital magnifier window.

FIG. 7 illustrates a particularly advantageous aspect of CUI 156. By selecting the optical zoom 164, a user can select the magnification of image data 204 derived from microform segment 60. However, it is generally advantageous to select this optical magnification such that image data 204 includes all of the data of a particular microform segment 60, so that a user knows, at least in general, what elements or data are on this segment, and for subsequent printing, storing or emailing of the segment 60. However, depending on the size of monitor 642, the quality of the originally scanned record, the reproduction quality of microform media 46 and segment 60, and the resolution capabilities of DMIA 22, image data 204 may not be readable, or easily readable, by a typical user.

By selecting the magnifier glass portion of digital magnifier 176, CUI 156 creates magnifier window 226. An indicator box 228 identifies which subsegment 230 of image data 204 is being illustrated in magnifier window 226. By clicking on indicator box 228 and dragging it around image data 204 a user can pan around image data 204, with the subsegment data of new locations being shown in magnifier window 226. However, the data within indicator box 228 itself is not magnified, and indicator box 228 itself does not provide the functionality to expand indicator box 228. Instead, selecting the arrow portion of digital magnifier 176 selects the digital magnification of the subsegment 230 of image data 204 within magnifier window 226, and magnifier window 226 can be expanded transversely, longitudinally and diagonally by placing the cursor on one of the sides, or a corner, and mouse clicking and dragging to expand magnifier window 226, as is typical in windows of Windows® operating system. Scroll bars 232, 234 of magnifier window 226 can be used to scroll within window 226. Although indicator box 228 moves and expands with magnifier window 226, the data within indicator box 228 is not digitally magnified, in contrast with the data within magnifier window 226.

A programmer with ordinary skill in the art in Windows® operating system including callable subroutines, or other operating systems and their callable subroutines, and C++ or Visual Basic programming language can create the CUI 156 as shown in FIGS. 5-7 and defined above.

Area sensors that support decimation are also contemplated for use. Area sensors that support decimation can read out every other, every third, fourth, fifth, or sixth pixel, as non-limiting examples. Reading fewer pixels reduces resolution, however it also speeds up refresh rate. Refresh rates while in the landscape mode may be reduced. Further, some are sensors allow for the selection of switching the entire sensor from color to grayscale to black and white. It is also to be appreciated that area sensors that can support multiple modes simultaneously are also contemplated for use in the same or similar ways as described above for both color and monochrome sensors.

Figure 8:
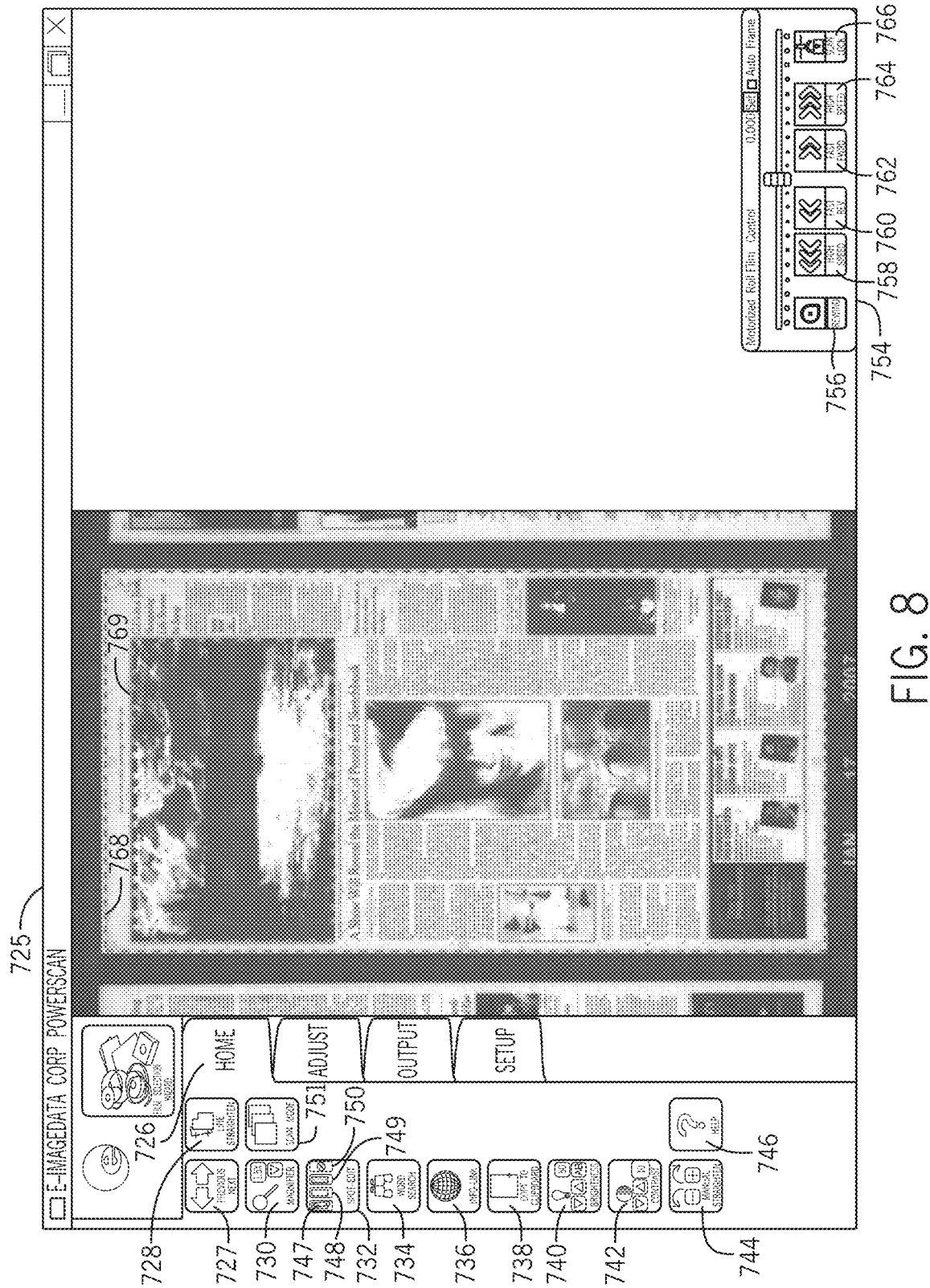
FIG. 8 is an example of an embodiment of a user interface usable with the present invention.

FIG. 8 illustrates an example of another embodiment of a user interface 725 for use with embodiments of the invention. The user interface 725 can contain a home screen 726 having a variety of buttons used to control features of the imaging system 20. As non-limiting examples, control buttons can include previous and next buttons 727, a line straighten button 728, a spot EDIT button 730, a word search button 734, an INFO Link button 736, a copy to clipboard button 738, brightness buttons 740, contrast buttons 742, mode buttons 751, manual straightening buttons 744, and a help button 746. The previous and next buttons 727 allow the user to move between images.

The spot EDIT button 730 can have four sub-buttons: a pencil tool button 747, a white redact tool button 748, a black redact tool button 749, and a cancel zone button 750. The pencil tool button 747 can allow the user to draw the perimeter of a zone 769. Zones can be rectangular or irregular in shape and can be marked with borders. For example, when the user is finished drawing the perimeter of a zone, the perimeter of the zone 769 may become a magenta border to indicate that the zone is active. The active zone, the selected one for setting the mode (color, grayscale, and black and white), brightness, and contrast, may be marked with a bold border. A zone may be made active by moving a mouse cursor somewhere inside the border and left clicking. In some embodiments, when a zone is made active, the brightness 740, contrast 742, and mode 751 buttons can be highlighted to indicate that they are active. The mode and the brightness and contrast of each zone can be adjusted independently. The mode buttons 751 can be used to adjust the mode of the active zone between different types of modes including color, grayscale, and black and white, as non-limiting examples. The zones created by the user also may be automatically defined by processing unit 604, which may be designed to read the composition of the document, as stated above. The white redact tool button 748 allows the user to make the entire active zone white. The black redact tool button 749 allows the user to make the entire active zone black. The redact tools may be used for security purposes on images that have sensitive information. The user also may just want to remove some of the information because of personal preference. The cancel zone button 750 allows the user to cancel the active zone or, if the cancel zone button 750 is double clicked, cancel all zones. The dashed line identifies a crop box 768. The crop box 768 can define the area to be printed, scanned, or emailed, as non-limiting examples. It is to be appreciated that the multi-mode image can be printed directly, without saving to a file, and retains the same beneficial characteristics of smaller file sizes, preserved image detail, and when selected, the preferred black text on a white background appearance. The user interface 725 can also contain an output screen 752 and a setup screen 753.

The word search button 734 allows the user to search for words in the image, and in some embodiments, without the text having been OCR'd. The INFO Link button 736 allows the user to search for selected words in an internet search engine or other information source. The copy to clipboard button 738 allows the user to copy the image to clipboard for later use by the user. The brightness buttons 740 allow the user to change the brightness of the active zone to the desired level. The contrast buttons 742 allow the user to change the contrast of the active zone to the desired level. The help button 746 brings up a screen to assist the user with various anticipated problems the user might have with the program.

The user interface 725 can also contain a motorized roll film control 754 designed for use with microfilm. The motorized film control 754 contains a rewind button 756, a high speed reverse button 758, a fast reverse button 760, a fast forward button 762, a high speed forward button 764, and a lock button 766. The rewind button 756, high speed reverse button 758, fast reverse button 760, fast forward button 762, and a high speed forward button 764 allow the user to go back and forth on a roll of film at whatever speed is desired by the user. The lock button 766 allows the speed of the film to be held at a consistent slow speed.

Figure 9:
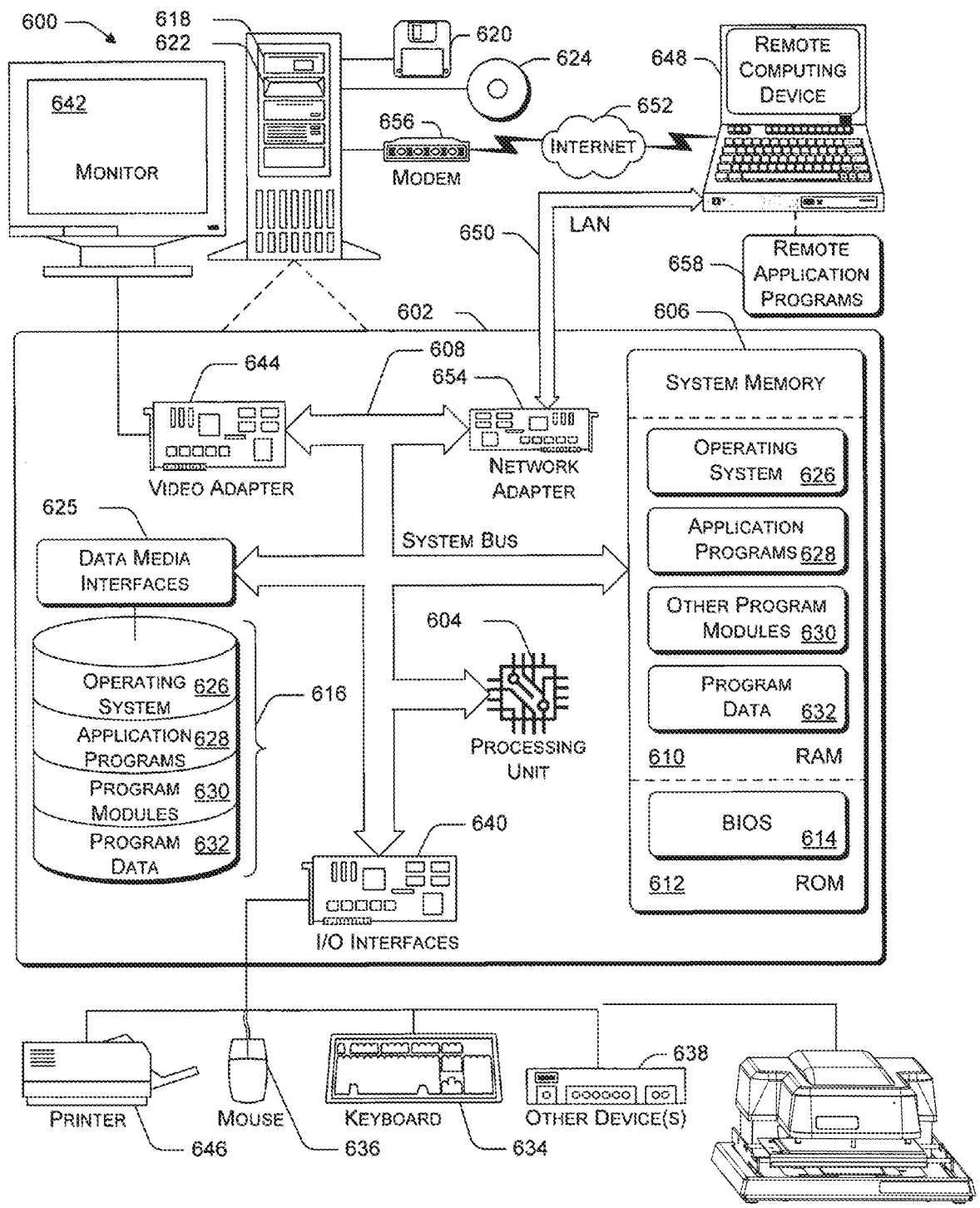
FIG. 9 is a schematic view of a general computing environment including the digital microform imaging system and computer of FIG. 1.

FIG. 9 illustrates a general computer environment 600, which can be used to implement the techniques according to the present invention as described above. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 can include a general-purpose computing device in the form of a computer 602. The components of computer 602 can include, but are not limited to, one or more processors or processing units 604, system memory 606, and system bus 608 that couples various system components including processor 604 to system memory 606.

System bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 602 may include a variety of computer readable media. Such media can be any available media that is accessible by computer 602 and includes both volatile and non-volatile media, removable and non-removable media.

System memory 606 can include computer readable media in the form of volatile memory, such as random access memory (RAM) 610, and/or non-volatile memory, such as read only memory (ROM) 612 or flash RAM. Basic input/output system (BIOS) 614, containing the basic routines that help to transfer information between elements within computer 602, such as during start-up, is stored in ROM 612 or flash RAM. RAM 610 typically contains data and/or program modules that are immediately accessible to and/or presently operated on by processing unit 604.

Computer 602 may also include other removable/non-removable, volatile/non-volatile computer storage media. By way of example, FIG. 9 illustrates hard disk drive 616 for reading from and writing to a non-removable, non-volatile magnetic media (not shown), magnetic disk drive 618 for reading from and writing to removable, non-volatile magnetic disk 620 (e.g., a "floppy disk"), and optical disk drive 622 for reading from and/or writing to a removable, non-volatile optical disk 624 such as a CD-ROM, DVD-ROM, or other optical media. Hard disk drive 616, magnetic disk drive 618, and optical disk drive 622 are each connected to system bus 608 by one or more data media interfaces 625. Alternatively, hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, removable magnetic disk 620, and removable optical disk 624, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like, can also be utilized to implement the example computing system and environment.

Any number of program modules can be stored on hard disk 616, magnetic disk 620, optical disk 624, ROM 612, and/or RAM 610, including by way of example, operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

One example of an application program 628 is an OCR engine. The OCR engine may be a commercially available program. One such OCR engine is named ABBYY FineReader and is available from ABBYY USA, Inc.

A user can enter commands and information into computer 602 via input devices such as keyboard 634 and a pointing device 636 (e.g., a "mouse"). Other input devices 638 (not shown specifically) may include a microphone, joystick, game pad, satellite dish, serial port, scanner, and/or the like. These and other input devices are connected to processing unit 604 via input/output interfaces 640 that are coupled to system bus 608, but may be connected by other interface and bus structures, such as a parallel port, game port, or a universal serial bus (USB).

Monitor 642 or other type of display device can also be connected to the system bus 608 via an interface, such as video adapter 644. In addition to monitor 642, other output peripheral devices can include components such as speakers (not shown) and printer 646 which can be connected to computer 602 via I/O interfaces 640. In addition, monitor 642 may comprise a touch screen so as to allow the user to provide input to the processing unit 604 by simply touching the screen.

Computer 602 can operate in a networked environment using logical connections to one or more remote computers, such as remote computing device 648. By way of example, remote computing device 648 can be a PC, portable computer, a server, a router, a network computer, a peer device or other common network node, and the like. Remote computing device 648 is illustrated as a portable computer that can include many or all of the elements and features described herein relative to computer 602. Alternatively, computer 602 can operate in a non-networked environment as well.

Logical connections between computer 602 and remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, computer 602 is connected to local network 650 via network interface or adapter 654. When implemented in a WAN networking environment, computer 602 typically includes modem 656 or other means for establishing communications over wide network 652. Modem 656, which can be internal or external to computer 602, can be connected to system bus 608 via I/O interfaces 640 or other appropriate mechanisms. It is to be appreciated that the illustrated network connections are examples and that other means of establishing at least one communication link between computers 602 and 648 can be employed.

In a networked environment, such as that illustrated with computing environment 600, program modules depicted relative to computer 602, or portions thereof, may be stored in a remote memory storage device. By way of example, remote application programs 658 reside on a memory device of remote computer 648. For purposes of illustration, applications or programs and other executable program components such as the operating system are illustrated herein as discrete blocks, although it is recognized that such programs and components reside at various times in different storage components of computing device 602, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

The present invention is not limited by the DMIA 22 shown as there are other DMIAs, or microfilm or micro opaque readers, scanners, etc., which are available which can be used in conjunction with a computer and the CUI of the present invention. Further, the present invention is not limited by a separate DMIA 22 and computer 602. For example, computer 602 can be integrated into DMIA 22, or can be part of controller 116. Yet further, monitor 642 can be a part of DMIA 22, or one of these variation, instead of a separate device.

Figure 10:
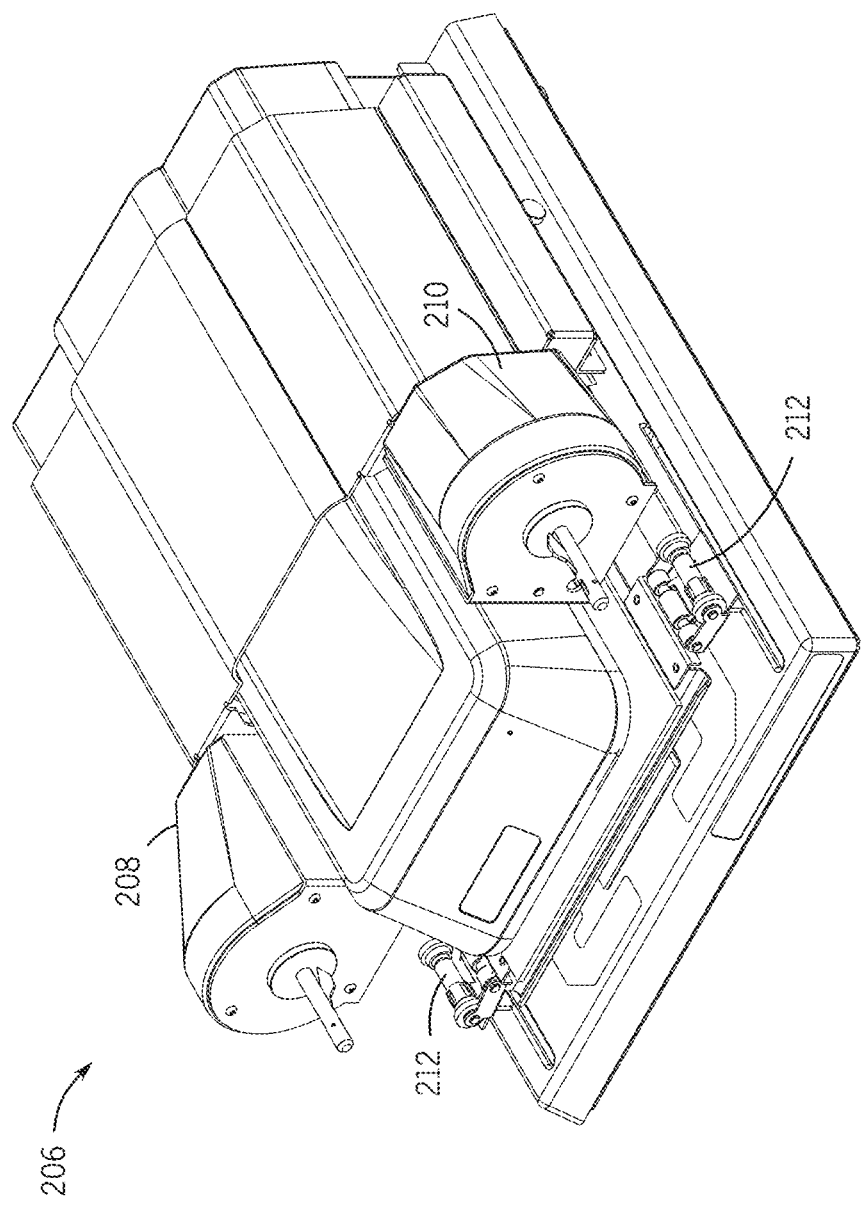
FIG. 10 is a perspective view of another embodiment of a digital microform imaging apparatus according to the present invention, particularly illustrating a motorized roll film microform media support.
Figure 11:
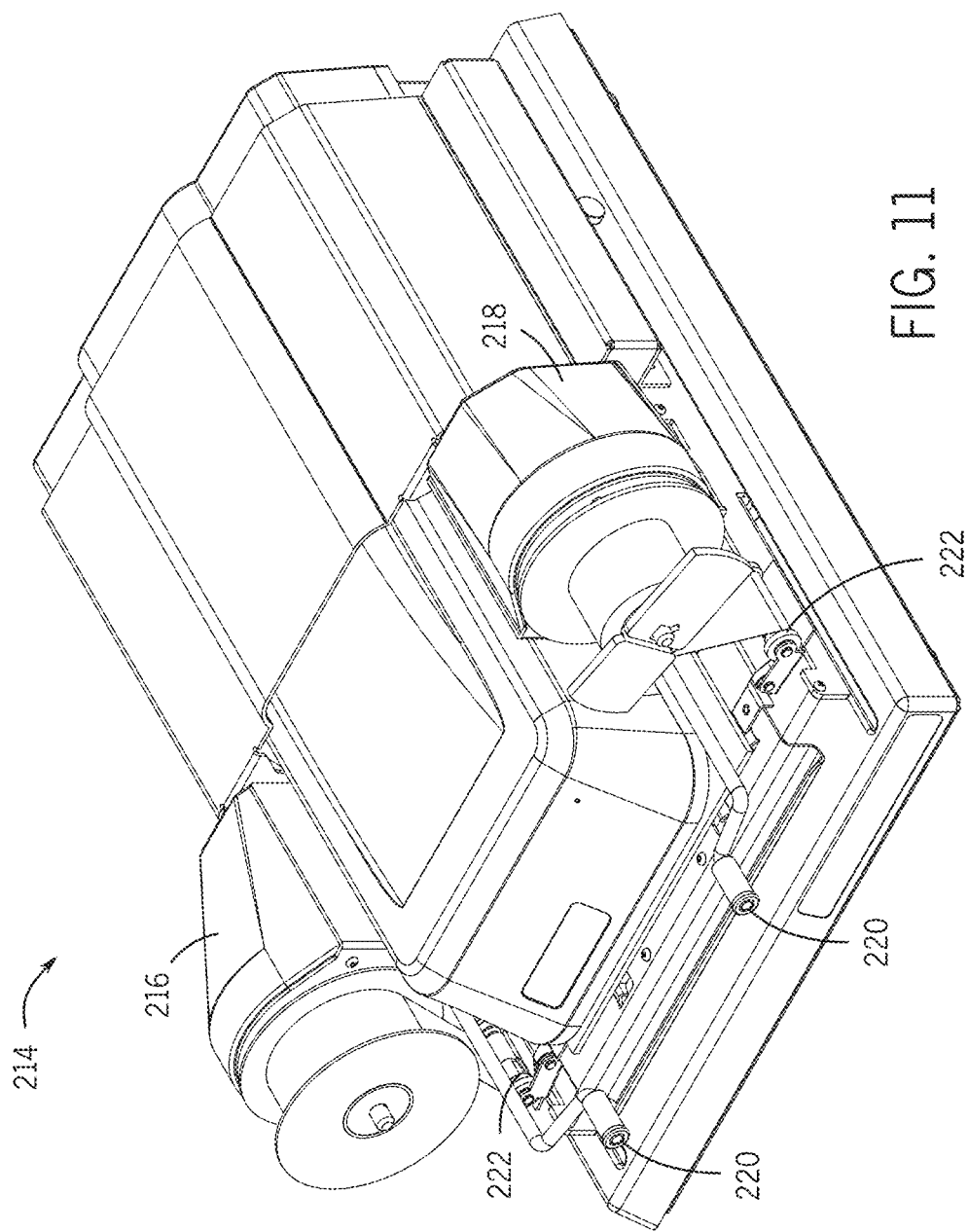
FIG. 11 is a perspective view of another embodiment of a digital microform imaging apparatus according to the present invention, particularly illustrating a hand operated roll film microform media support.

Media 46 can include any microform image formats such as microfiche, ultrafiche, aperture cards, jacketed microfiche, 16 mm or 35 mm open spool roll film, 16 mm cartridge roll film and micro opaque cards. Micro opaque cards are different than transparent film. Images are recorded on an opaque medium. To view these micro images one needs to use reflected light. The present invention can use LED arrays 37 (FIG. 2A) for use with micro opaques, which can be the same, or similar to, the monochromatic LED's that are used in illumination source 36. In the embodiment of FIG. 10, DMIA 206 includes a microform media support in the form of motorized roll film attachment with supply side 208 and take up side 210 and film guides 212, in addition to X-Z table 44. In the embodiment of FIG. 11, DMIA 214 includes a microform media support in the form of hand operated roll film attachment with supply side 216 and take up side 218 with cranks 220, and film guides 222, in addition to X-Z table 44. In other ways, DMIAs 206 and 214 are similar to or the same as DMIA 22. Therefore, the microform media support structure according to the present invention is at least one of a X-Z table, a motorized roll film carrier, and a hand operated roll film carrier.

Figure 12:
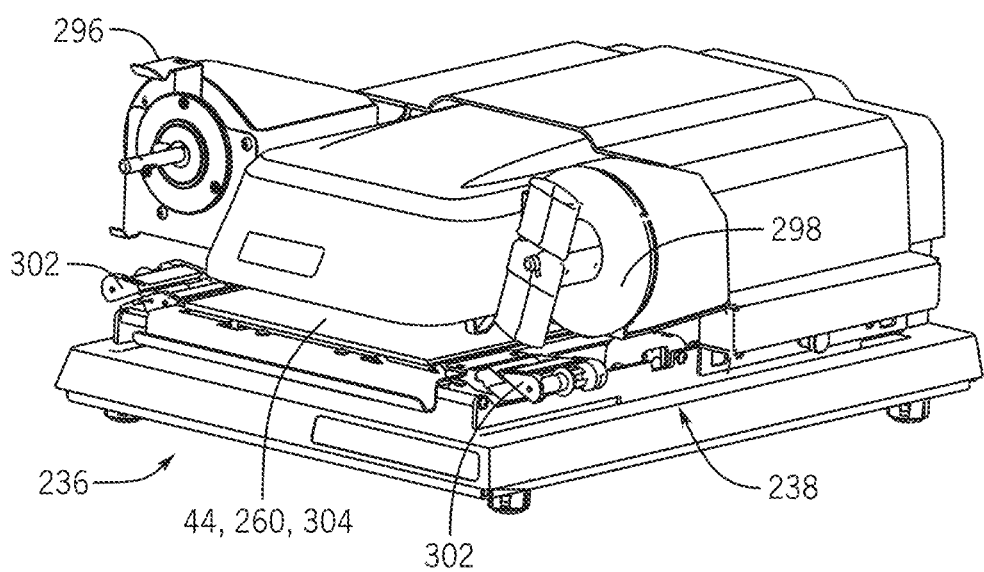
FIG. 12 is a perspective view of another embodiment of a digital microform imaging apparatus according to the present invention, particularly illustrating a film guide assembly.

FIG. 12 is a perspective view of another embodiment of a digital microform imaging apparatus 236 according to the present invention, particularly illustrating a motorized roll film microform media support 238.

Figure 13:
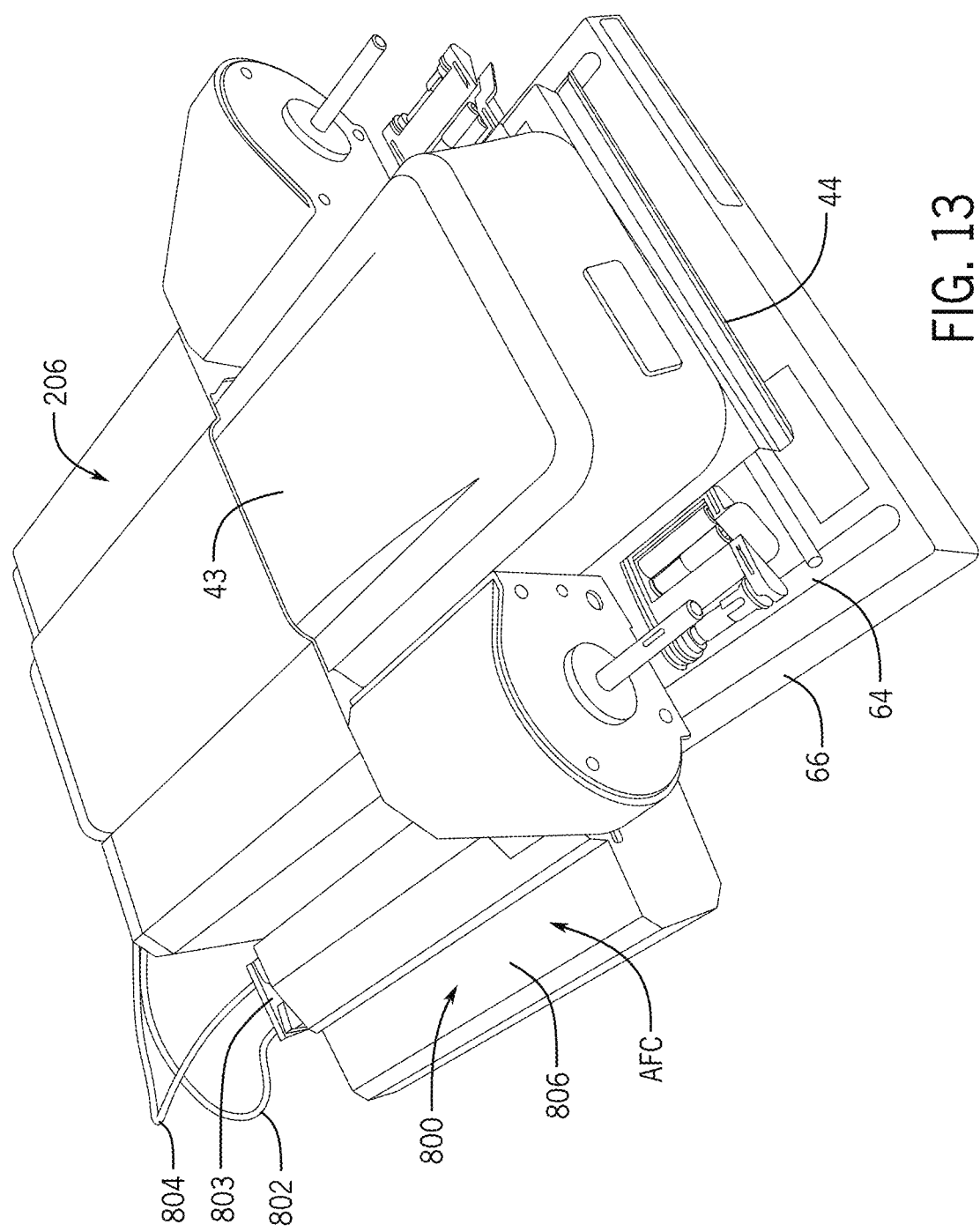
FIG. 13 is a perspective view of a digital microform imaging apparatus with a motorized microform carrier.

Referring now to FIG. 13, a motorized microform transport device 800 is shown coupled to the DMIA 206. In some embodiments, the motorized microform transport device 800 can be removably coupled to any of the DMIAs 22, 206, 214, 236. For example, the motorized microform transport device 800 can be fastened to the brackets 64 or the chassis 66, as described below. The motorized microform transport device 800 can be coupled to the microform media support (e.g., the X-Z table 44) and can be configured to automatically move the microform media support 44 in one or more different directions. In some examples, the motorized microform transport device 800 can move the microform media support 44 along two separate, perpendicular axes. For example, the microform media support 44 can be moved by the motorized microform transport device 800 along both the X-axis and the Z-axis, while maintaining a constant or near-constant height (e.g., along the Y-axis). Cables 802, 804 can extend from the motorized microform transport device 800 to the DMIA 22, 206, 214, 236 to place the two units in electrical communication and to provide power from the DMIA 22, 206, 214, 236 to the motorized microform transport device 800. In some embodiments, the cables 802, 804 are part of a double cable assembly (as shown), and are provided with an adaptor 803 to ensure the cables 802, 804 are properly received into both the DMIA 22, 206, 214, 236 and the motorized microform transport device 800 at connector 805 (shown in FIG. 15). Optionally, the cables 802, 804 can also place the motorized microform transport device 800 in electrical communication with the computer 602 and/or the monitor 642.

Figure 14:
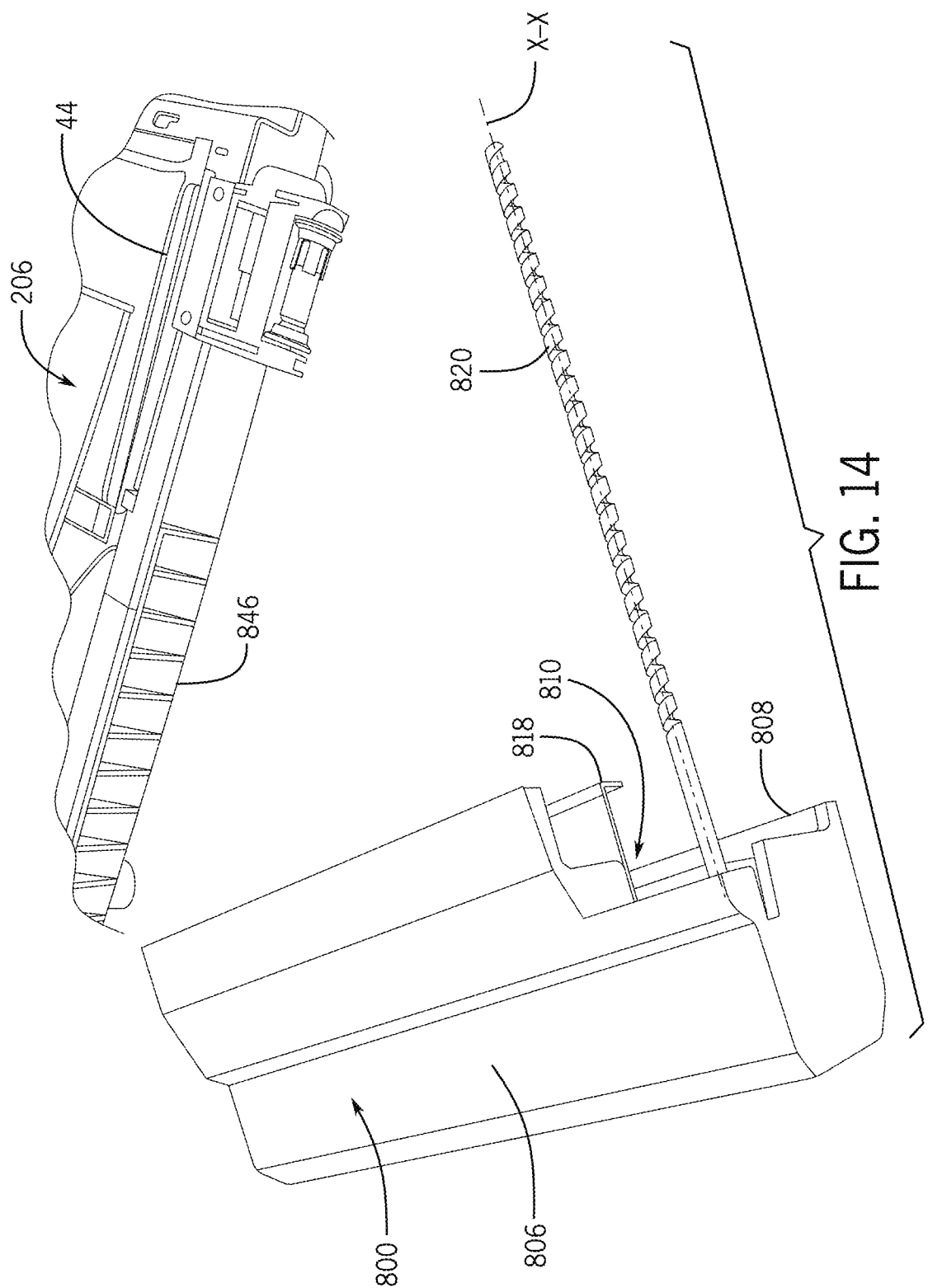
FIG. 14 is a perspective view of the motorized microform carrier of FIG. 13 uncoupled from the digital microform imaging apparatus.
Figure 15:
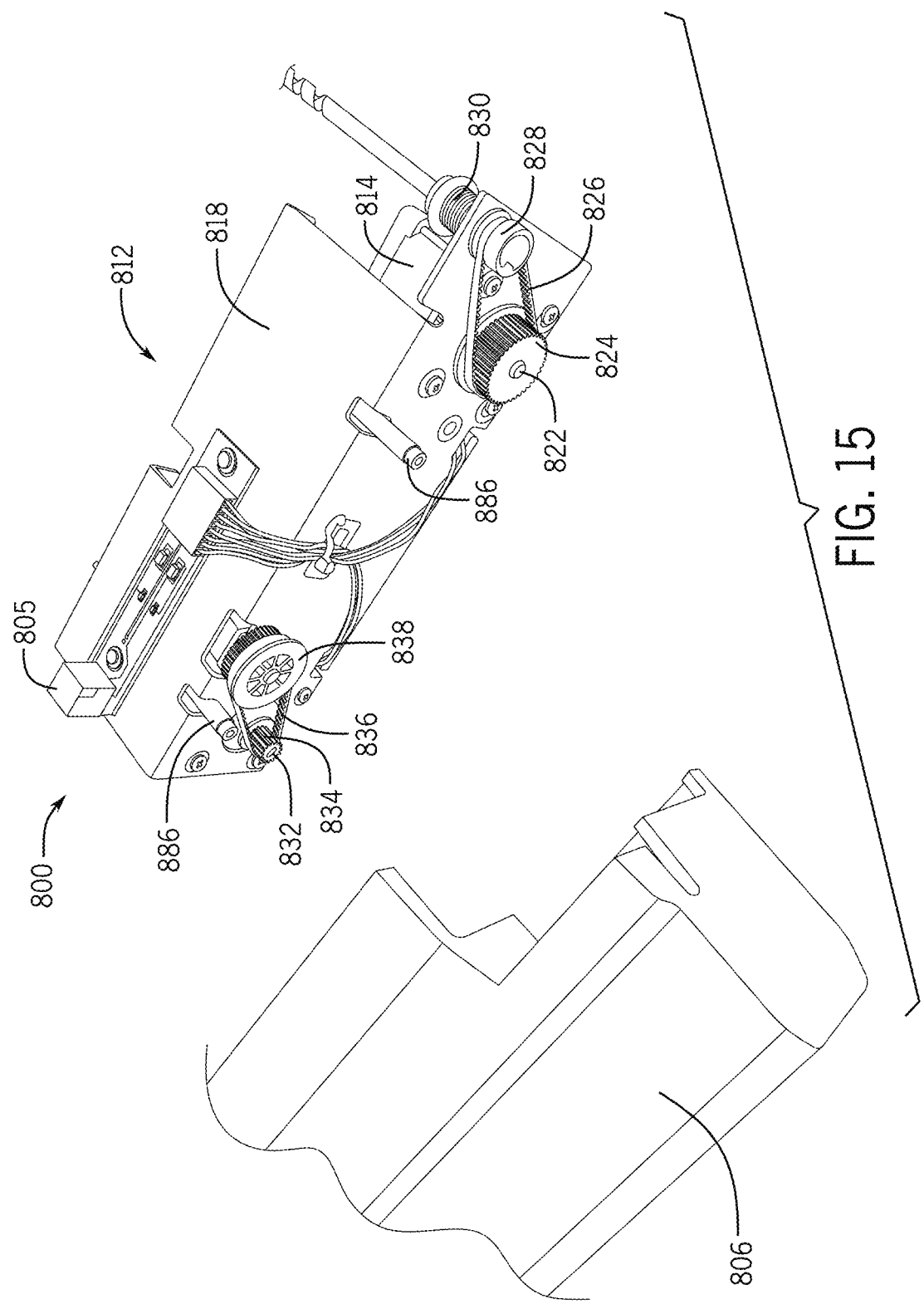
FIG. 15 is a top perspective view of internal components present in the motorized microform carrier of FIG. 13.
Figure 16:
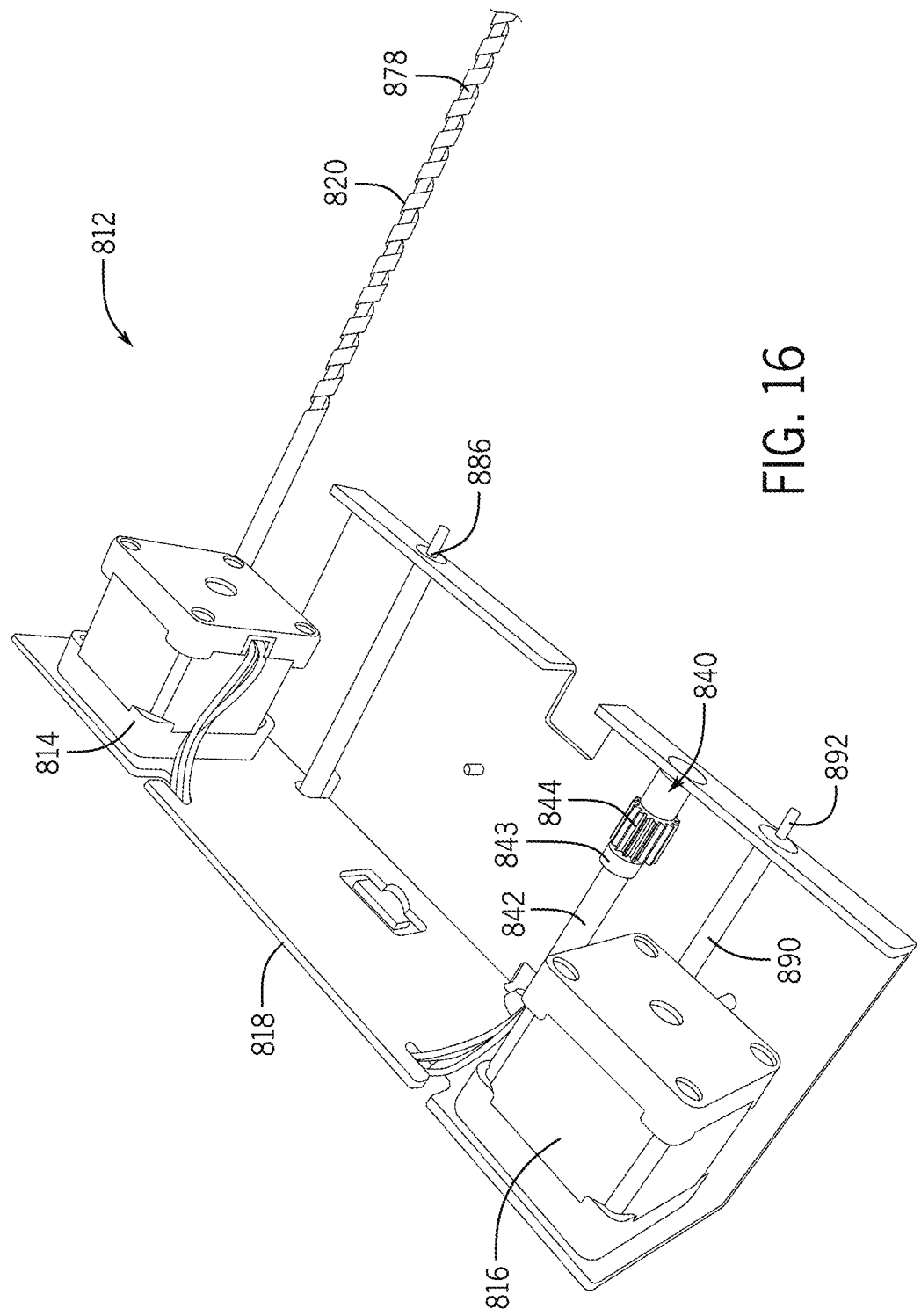
FIG. 16 is a bottom perspective view of the internal components shown in FIG. 15.

With further reference now to FIGS. 14-16, the motorized microform transport device 800 is shown uncoupled from a DMIA 22, 206, 214. The motorized microform transport device 800 has a housing 806 that can be removably coupled to the chassis 66, brackets 64, or cover 43, for example. In some embodiments, the housing 806 is a molded component that has interior walls 808 defining a cavity 810. The cavity 810 receives a drive assembly 812 of the motorized microform transport device 800. In some aspects, the housing 806 is formed of a polymeric material.

The drive assembly 812 received within the cavity 810 of the housing 806 can be used to move the microform media support 44 along multiple axes. For example, the drive assembly 812 can move the microform media support 44 relative to the area sensor 97 to allow the area sensor 97 to assess different images located upon microform media loaded into the microform media support 44. As the images on the microform media may be positioned in arrays, it may be desirable to move the microform media support 44 along one or more axes to position each image of the microform media beneath the sensor 97, where it can be detected, captured, and displayed.

In some embodiments, the drive assembly 812 includes two motors 814, 816 (see FIG. 16) coupled to a carriage 818 received within the cavity 810 of the housing 806. The carriage 818 can support the motors 814, 816 and can be coupled to the bracket 64, which is movable relative to the chassis 66 of the DMIA 22, 206, 214, 236. A first motor 814 can be configured to drive the microform media support 44 along the X-axis, while a second motor 816 can be configured to drive the microform media support 44 along the Z-axis. Although the motors 814, 816 are shown in a specific orientation, those skilled in the art will appreciate that motor orientations of any kind can be used, as a combination of bevel gears or worm gears (not shown) can also be used to drive the microform media support 44 along both of the X and Z axes, if desired.

The first motor 814 can be a stepper motor or a servo motor, as non-limiting examples, and can be placed in operative communication with a lead screw 820 that extends away from the carriage 818 toward the microform media support 44. A drive shaft 822 can be driven by the first motor 814 and can be coupled a first pulley 824 that rotates in concert with the drive shaft 822. The first pulley 824 can be mechanically coupled to the drive shaft 822 (e.g., using adhesive). A first belt 826 can be received around a portion of the first pulley 824 and a second pulley 828 positioned at a proximal end 830 of the lead screw 820, and can be tensioned to transmit force from the first pulley 824 to the lead screw 820. Rotational motion of the first pulley 824 (e.g., produced by the motor rotating the drive shaft 822) drives the first belt 826, which in turn rotates the second pulley 828 and the proximal end 830 of the lead screw 820. In some embodiments, the second pulley 828 is press fit onto the proximal end 830 of the lead screw 820.

The second motor 816, similar to the first motor 814, can also be a stepper motor or a servo motor. The second motor 816 can be coupled to the carriage 818 and can be configured to move the carriage 818 relative to the chassis 66 of the DMIA 22, 206, 214, 236. Like the first motor 814, the second motor 816 can rotate a drive shaft 832 that is coupled to a third pulley 834. A second belt 836 extends between the third pulley 834 and a fourth pulley 838, and is tensioned to transmit rotational force between the fourth pulley 838 and the third pulley 834. The fourth pulley 838 is mechanically coupled to a gear drive 840 including a shaft 842 and a gear 844. The gear 844 can be coupled to a gear rack assembly 846 (shown in FIG. 17) to drive the housing 806, drive assembly 812, bracket 64, and the lead screw 820 along the Z-axis, relative to the chassis 66 of the DMIA 22, 206, 214, 236. The shaft 842 can include a roller 843 that can be configured to ride along a track 845 of the gear rack assembly 846 to provide smooth operation.

Figure 17:
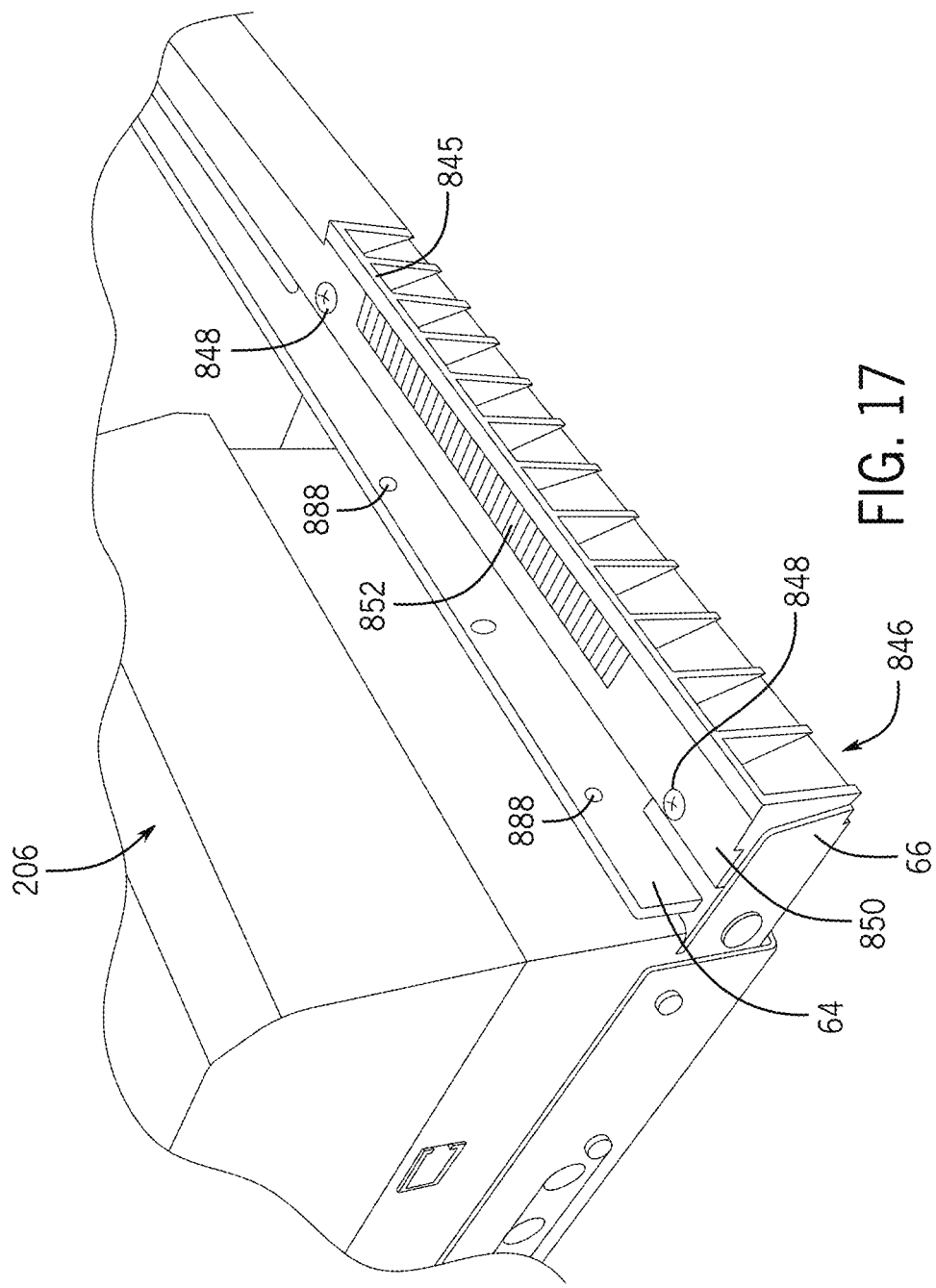
FIG. 17 is a perspective view of a gear rack assembly coupled to the digital microform imaging apparatus.

The motorized microform transport device 800 can be mounted to a side of the DMIA 22, 206, 214, 236, which allows movement without interference from other components on the DMIA 22, 206, 214, 236. As shown in FIG. 17, a gear rack assembly 846 can be initially coupled to the chassis 66 of the DMIA 22, 206, 214. One or more fasteners 848 can be threaded through a tab 850 and into the chassis 66 to mount the gear rack assembly 846 in place on the DMIA 22, 206, 214, 236. The gear rack assembly 846 can be formed of a polymeric material, such as acetal, for example. The gear rack assembly 846 can include a series of rack teeth 852 that are sized to receive the gear 844 coupled to the second motor 816, as well as a track 845 that can receive and direct the roller 843 coupled to the shaft 842.

To install the housing 806 and drive assembly 812 of the motorized microform transport device 800 onto the DMIA 22, 206, 214, 236, the motorized microform transport device 800 is coupled to both the gear rack assembly 846 and the microform media support 44. Specifically, the drive assembly 812 can be coupled to both the underside of the microform media support 44 and the bracket 64 that is longitudinally movable 68 relative to the chassis 66, as described previously.

Figure 18:
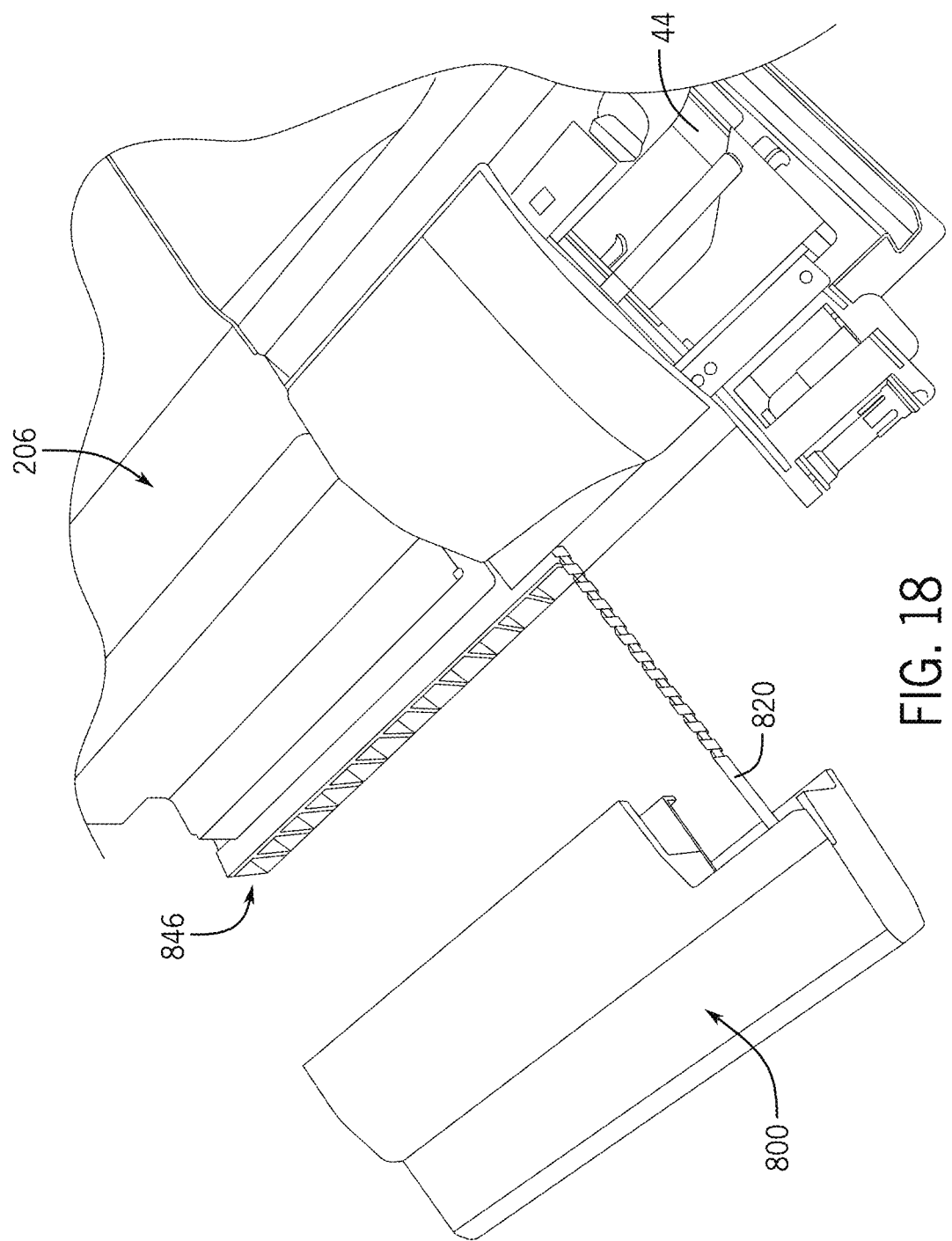
FIG. 18 is a partially disassembled view of the digital microform imaging apparatus of FIG. 13 showing the relationship between the motorized microform carrier of FIG. 13 and the gear rack assembly of FIG. 17.
Figure 19:
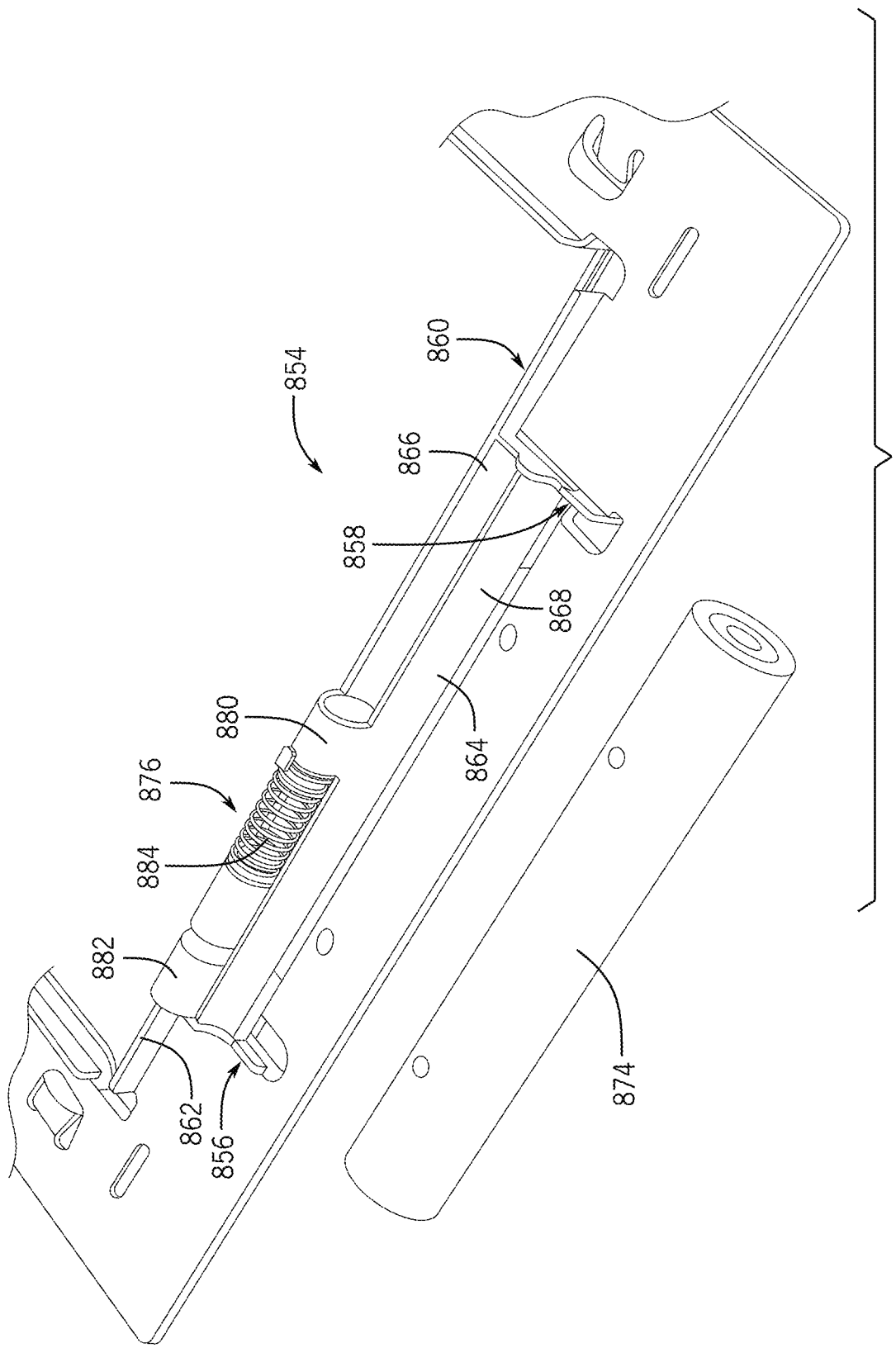
FIG. 19 is a perspective view of a follower assembly that can be used with the motorized microform carrier of FIG. 13.
Figure 20:
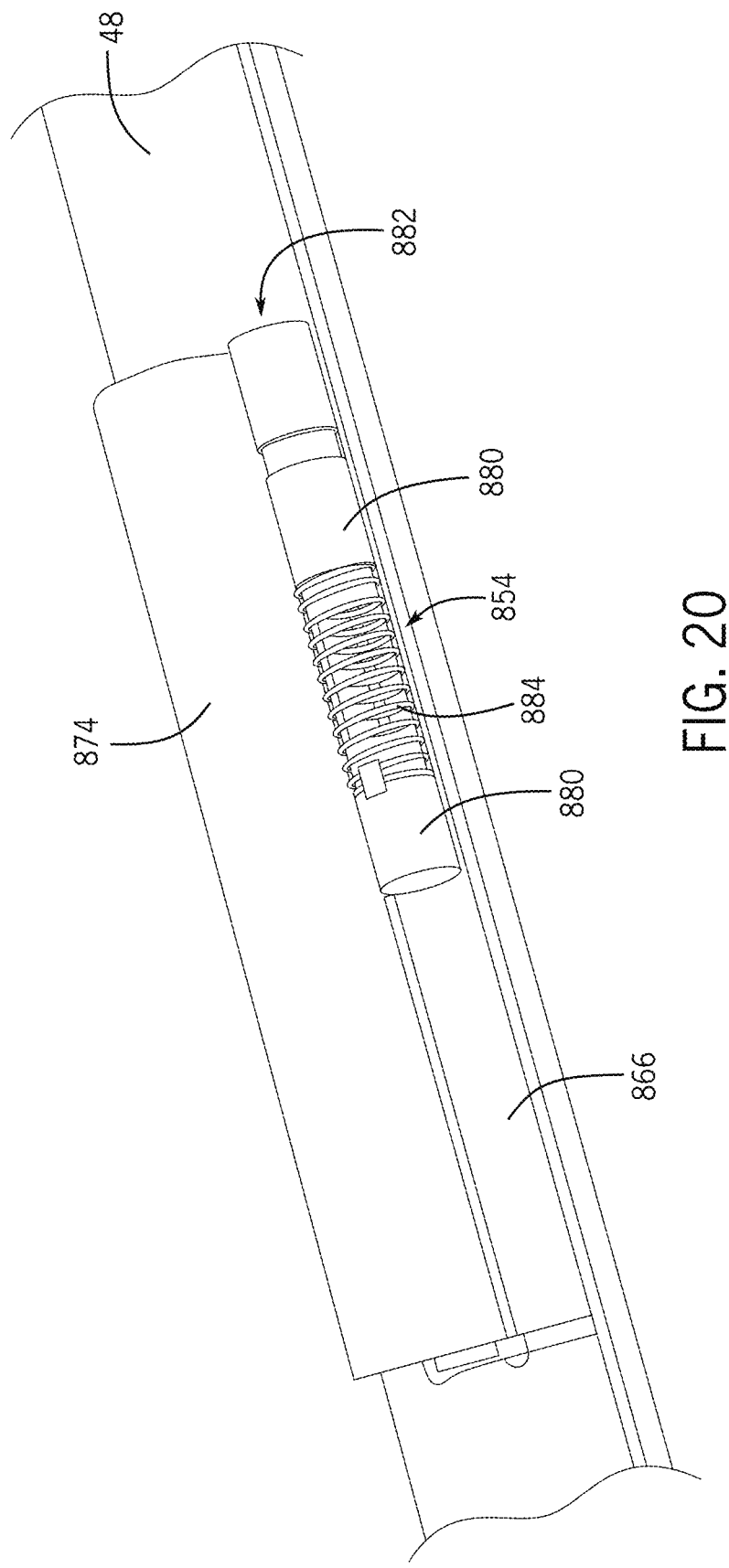
FIG. 20 is a detailed perspective view of the follower assembly of FIG. 19.

To couple the motorized microform transport device 800 to the underside of the microform media support 44, the lead screw 820 can be inserted into a follower assembly 854, as shown in FIGS. 18-20. The follower assembly 854 can be mechanically coupled (e.g., adhesively, using a two-sided tape) to the underside of the microform media support 44, and can be positioned between tabs 856, 858 and flanges 860, 862, which help locate and support the follower assembly 854. The follower assembly 854 includes a holder 864 having one or more curved walls 866, 868, each separately defining a groove-like shape. A bearing tube assembly 874 can be installed against the curved wall 868 and a lead screw nut assembly 876 can be installed against the curved wall 866, which together help move the microform media support 44 relative to the chassis 66.

The lead screw 820 can include helical threads 878, which can be received within and coupled to two or more threaded lead screw nuts 880 in the lead screw nut assembly 876. The helical threads 878 can include an interruption (e.g., a notch) in each thread, which can allow the lead screw 820 to be molded, rather than machined. In some embodiments, the lead screw nut assembly 876 also includes a cylindrical guide 882 that helps align the lead screw 820 with the lead screw nut assembly 876. The cylindrical guide 882 and the lead screw nuts 880 can each be formed of a polymeric material, such as acetal, for example. In some embodiments, each of the lead screw nuts 880 include slightly less than a single internal thread (e.g., a single revolution), which allows the lead screw nuts 880 to be molded, if necessary. The lead screw nuts 880 can be identical to one another, and can be loaded against the other by a biasing element, such as a compression spring 884. One lead screw nut 880 can be fixed in position within the groove 870, while the other lead screw nut 880 can be movable within the groove 870. The initial spacing between the internal thread of one lead screw nut 880 and the internal thread of another lead screw nut 880 is less than the thread pitch of the helical threads 878 of the lead screw 820. During the initial installation, the lead screw 820 can be passed through the cylindrical guide 882 and threaded into one lead screw nut 880, pushing away the second lead screw nut 880 against the force of the compression spring 884 until the internal threads of the second lead screw nut 880 align with the helical threads 878 of the lead screw 820. Once the threads of the second lead screw nut 880 are aligned, the lead screw 820 is ultimately threaded through the second lead screw nut 880. The compression spring 884 can be used to hold the lead screw nuts 880 firmly against the helical threads 878 of the lead screw 820, thereby providing dampening to the system and decreasing sources of positional error. The lubricous nature of the materials used to form the lead screw nuts 880, cylindrical guide 882, and lead screw 820 allows the lead screw nuts 880, and therefore the holder 864 and microform media support 44 to translate along a longitudinal axis X-X of the lead screw 820 as it rotates.

Once the lead screw 820 has been threaded into the lead screw nut assembly 876 of the microform media support 44, the housing 806 and drive assembly 812 of the motorized microform transport device 800 can be secured to the DMIA 22, 206, 214, 236. The housing 806 can be moved toward the chassis 66 of the DMIA 22, 206, 214, 236 until teeth on the gear 844 operatively coupled to the second motor 816 engage the rack teeth 852 on the gear rack assembly 846. Fasteners 886 (shown in FIG. 16), which extend from the housing 806 and through the carriage 818, can be threaded into and secured within holes 888 formed through the bracket 64. In some embodiments, the fasteners 886 include a bearing portion 890 and a threaded portion 892 which can provide additional support to the carriage 818 and housing 806. In some embodiments, a hex key (not shown) can be used to thread the fasteners 886 into the holes 888 formed through the bracket 64.

Figure 21:
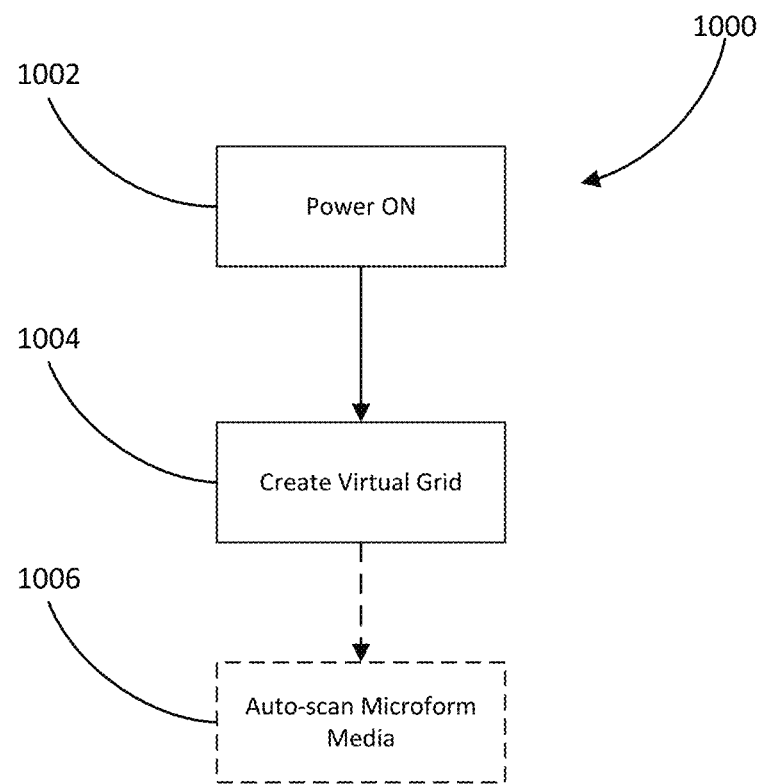
FIG. 21 is a process diagram detailing a method of using the digital microform imaging apparatus and motorized microform carrier of FIG. 13.
Figure 22:
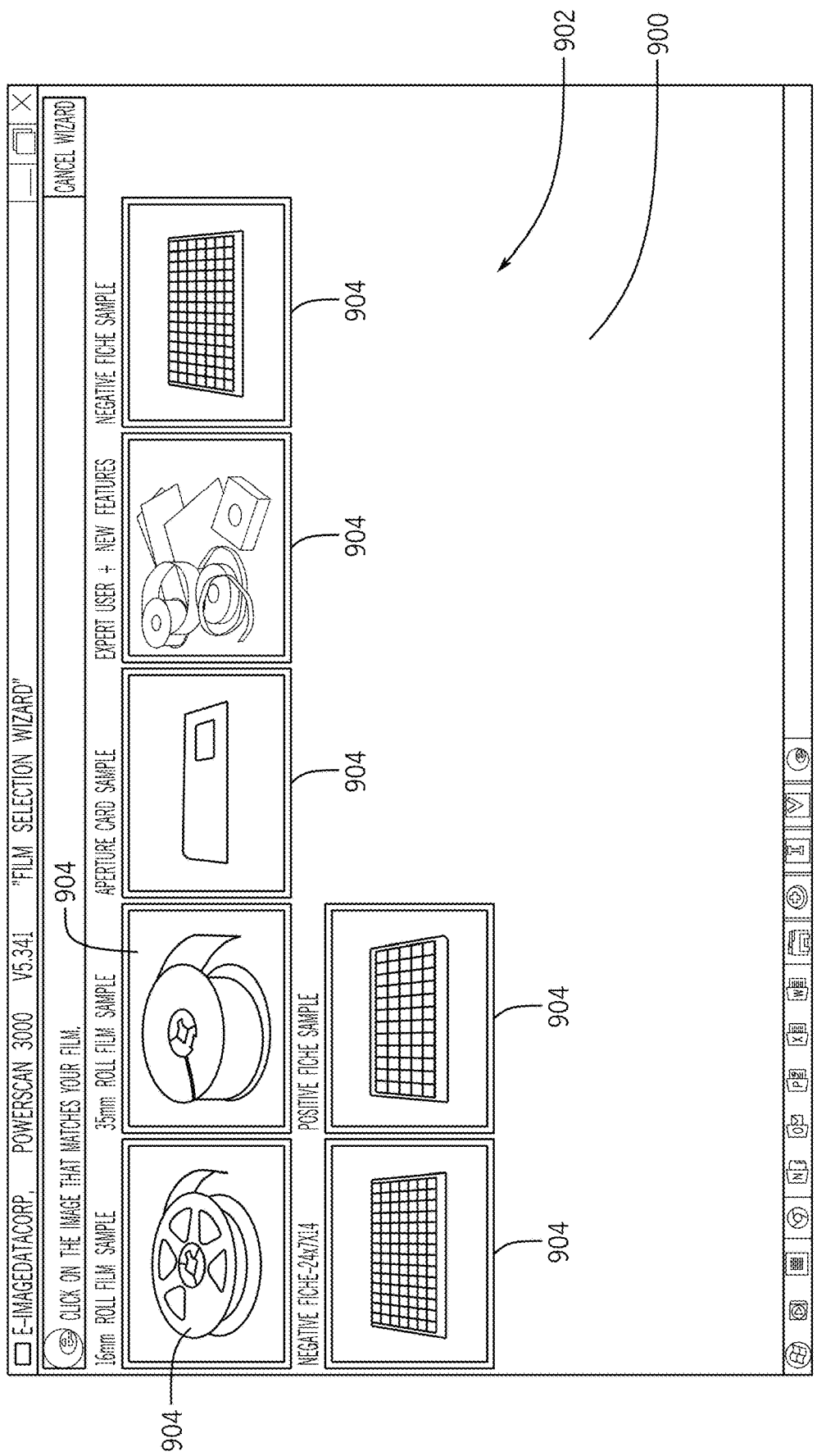
FIG. 22 is a screenshot of a computer user interface that can be present in the digital microform imaging apparatus assembly of FIG. 13.

With the motorized microform transport device 800 installed onto the DMIA 22, 206, 214, 236 the motorized microform transport device 800 can be operated, using the process 1000 illustrated by FIG. 21. At block 1002, the DMIA 22, 206, 214, 236 can be powered on or otherwise commanded to initiate a microform detection operation. For example, a user can be prompted to select a film type via the computer user interface (CUI) 900 shown in FIG. 22. A Film Selection Wizard 902 can be displayed on the monitor 642, where a user can use a mouse or other tool (e.g., a finger on a touchscreen) to select an appropriate icon 904 corresponding to a variety of different film types, including 16 mm Roll Film, 35 mm Roll Film, aperture cards, negative fiche, positive fiche, and the like.

Each of the icons 904 represent presets for the motorized microform transport device 800 and/or the DMIA 22, 206, 214, 236. In some embodiments, users can create their own presets and add an almost unlimited number of icons 904 to the Film Selection Wizard 902. For example, each of the presets can correspond to any of the various microfiche formats. Microfiche formats are typically characterized by having a certain number of rows and columns of images that are substantially uniform in size and spacing throughout the microfiche card. While the most-widely used microfiche card size is 105 mm by 148 mm (also sometimes called 4 by 6 inch), the number of images present on the card can vary, based upon the reduction ratio of the images present upon the card. For example, reduction ratios of anywhere between 15× to 150× or greater can be used to arrange the images on the microfiche card in a rectangular array. The reduction ratio and the size of the card can influence the number of rows and columns of images present on the card. For example, a 105 mm-by-148 mm-sized ultrafiche card with a reduction ratio of 120× may contain 70 columns and 30 rows of images (for a total of 2,100 reduced 8.5 by 11 inch images), while a microfiche card having a reduction ratio of 20× may include 12 columns and 5 rows of 8.5 by 11 inch images. In still other examples, the microfiche card can have an array of reduced 11 by 14 inch images. In these examples, the number of columns and rows of images on the microform card is closer to equal (e.g., at 24× reduction, 9 columns and 7 rows of images are present on a 105 mm by 148 mm card). Once a user creates a preset, the grid configuration can be saved in a local or external memory (e.g., by the computer 602). Accordingly, when a microfiche preset is later chosen from the Film Selection Wizard or from a file list, the virtual grid will appear as part of the preset, and the motorized microform transport device 800 will not have to be reconfigured.

Once the type of microform media has been selected, the computer 602 commands the microform media support 44 to establish a reference, or "home" position. In some embodiments, stall detection circuitry monitors the drive characteristics of the second motor 816, which can help both position the microform media support 44 and establish a reference for future motor 816 control. When prompted to establish a reference position, the second motor 816 is commanded to drive the drive assembly 812 toward a hard stop (e.g., provided by the chassis 66 or mechanism coupling the bracket 64 to the chassis 66). Once the drive assembly 812 reaches the hard stop, the stall detection circuitry can communicate to clear the stepper counter (thereby establishing the home position) and to the second motor 816 (e.g., via a microprocessor) to drive the microform media support 44 to a set position, which could be rearward of the home position, for example. The stall detection circuitry can detect the phase angle of the motor 816 at the stall position, which is then used to reset the stepper counter to zero. By having the home position established, the stepper motor can count steps away from the home position to accurately position the microform media support 44.

In addition to the second motor 816 driving the motorized microform carrier and microform media support 44 forward toward the hard stop described above, the lead screw 820 can drive the microform media support 44 horizontally to a "home" position along the X-axis. For example, the home position could be a location where the microform media support 44 is in its forward-most and right-most or left-most position. Similar to the second motor 816, the first motor 814 can have stall detection circuitry that monitors the motor 814 condition. Additional stops can be included on the frame 48, bracket 64, or chassis 66 which constrain the range of lateral movement (along the X-axis) that can be done by the microform media support 44. When the computer 602 commands the motorized microform transport device 800 to move the microform media support 44 to the home position, the first motor 814 can activate, causing the lead screw 820 to rotate. The follower assembly 854 then translates along the lead screw 820 until it abuts a stop. The stall detection circuitry can then issue a command to clear the stepper counter and to the first motor 814 to drive the microform media support 44 to a set position, such as an eject position away from the stop. In some embodiments, both the first motor 814 and the second motor 816 can operate simultaneously, and the microform media support 44 can rapidly travel along both the X-axis and the Z-axis to the home position each time the motorized microform transport device 800 is powered on. This can be useful to calibrate the motorized microform transport device 800, as the microform media support 44 can be moved manually by hand even when the motors 814, 816 are not activated.

The stall detection circuitry can monitor the drive characteristics of both the first motor 814 and the second motor 816 to help establish finite location reference points, which can be particularly useful when using stepper motors in an open-loop feedback system. With the location of the hard stops each established (i.e., at a home reference location), the computer 602 can then accurately determine the location of the microform media support 44 using both stepper motors 814, 816. The computer 602 (or other motor 814, 816 controller) can then count the number of steps each motor 814, 816 has taken away from the reference location (i.e., the hard stop), which provides a precise location that can eliminate the need for feedback or additional positional sensor circuitry.

Although both motors 814, 816 have been described as having stall detection circuitry to help position the microform media support 44, some embodiments of the invention can include optical sensors or encoders (not shown) to help accurately position the microform media support 44. For example, the motors 814, 816 can be servo motors that incorporate a closed-loop control system. In such examples, the motors 814, 816 may be equipped with optical sensors to constantly monitor and detect the position of the microform media support 44 and motors 814, 816, which would eliminate the need to establish the "home" reference position in the manner described above.

Once the home position has been established, the computer 602 commands the microform media support 44 to move to an eject position. The eject position can be a location where the microform media support 44 is extended outward from the cover 43, for example. To drive the microform media support 44 to the eject position, the second motor 816 can be actuated to drive the drive assembly 812 of the motorized microform transport device 800 forward along the Z-axis on the gear rack assembly 846. The drive assembly 812 moves the bracket 64 coupled to the microform media support 44 forward, which causes the microform media support 44 to extend outwardly away from the cover 43, where it can be more readily accessed and microform media can be inserted, removed, or otherwise adjusted. At this forward-most location, the second window 52 automatically hinges upward to allow access to the first window 50. In some embodiments, a spacer (e.g., tape) can be received upon the first window 50 to provide a small clearance between the windows 50, 52, which can prevent microform media from being pinched and/or rotated upward. In some examples, the first motor 814 drives the lead screw 820 to center the microform media support 44 along the X-axis.

Figure 23:
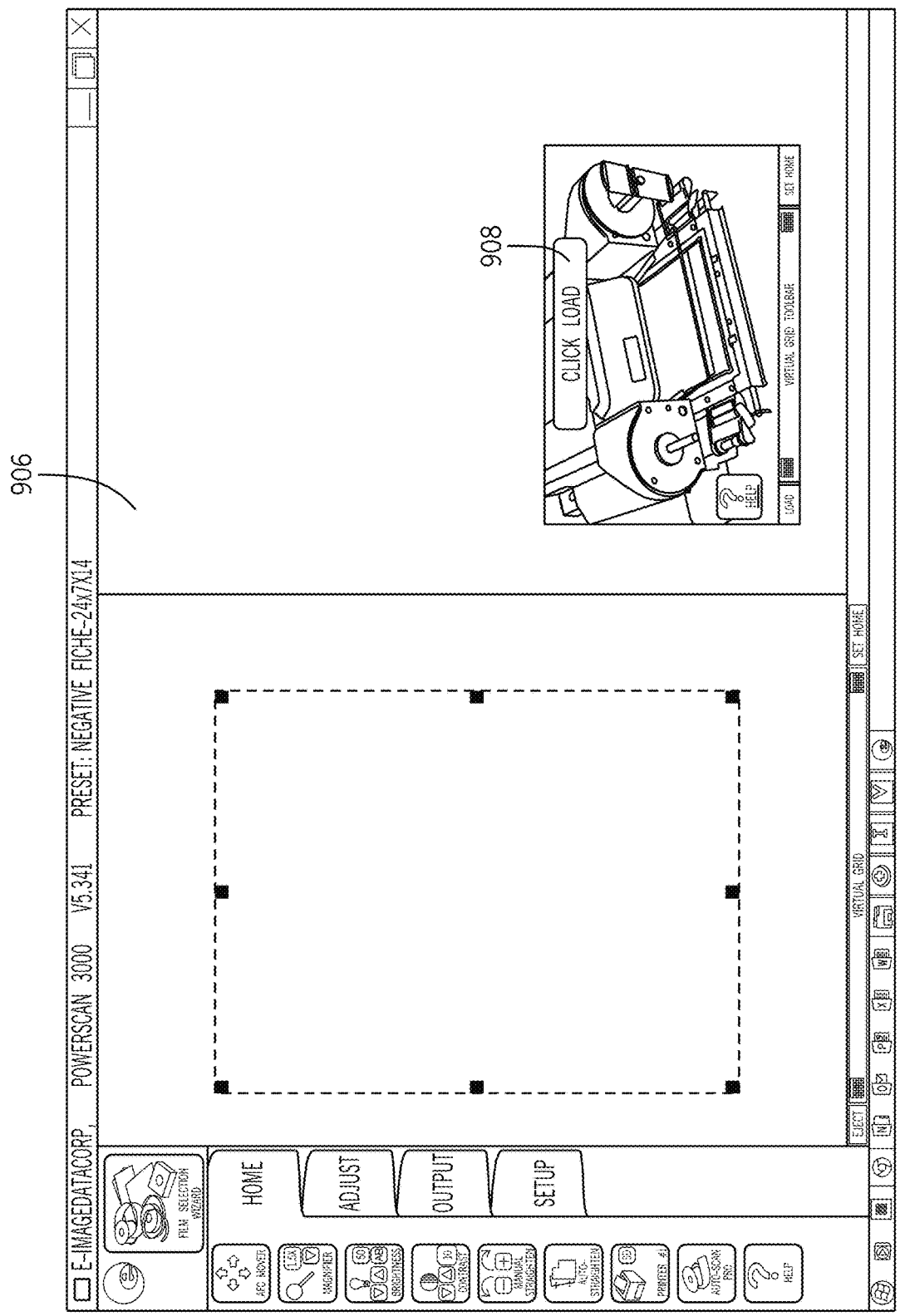
FIG. 23 is a screenshot of a second computer user interface that can be present in the digital microform imaging apparatus assembly of FIG. 13.

Once the microform media support 44 has been located at the eject position and the window 52 is angled upward, microform can be loaded onto the window 50. A user can place the microform media onto the window 50 and then tilt the window 52 downward against the spacer so that the windows 50, 52 can engage the microform media to hold it in place. In some aspects, the monitor 642 can display the computer user interface 906 shown in FIG. 23. If a user selects the "load" button 908, the window 52 can automatically be closed around the microform media. Using the computer user interface 910 shown in FIG. 24, the user can prompt the motors 814, 816 to position the microform media support 44 properly below the area sensor 97 to display images 912 of the microform media onto the monitor 642. A user can use a keyboard, joystick, or other input method to position the microform media support 44 and microform media beneath the area sensor 97. Preferably, the image 912 on the microform can be positioned within the area sensor 97. In some embodiments, users can also select tools that can include "zoom," "mirror," "straighten," "orient," and "rotate" from the computer user interface 910 to manipulate the image for viewing on the monitor 642.

Figure 25:
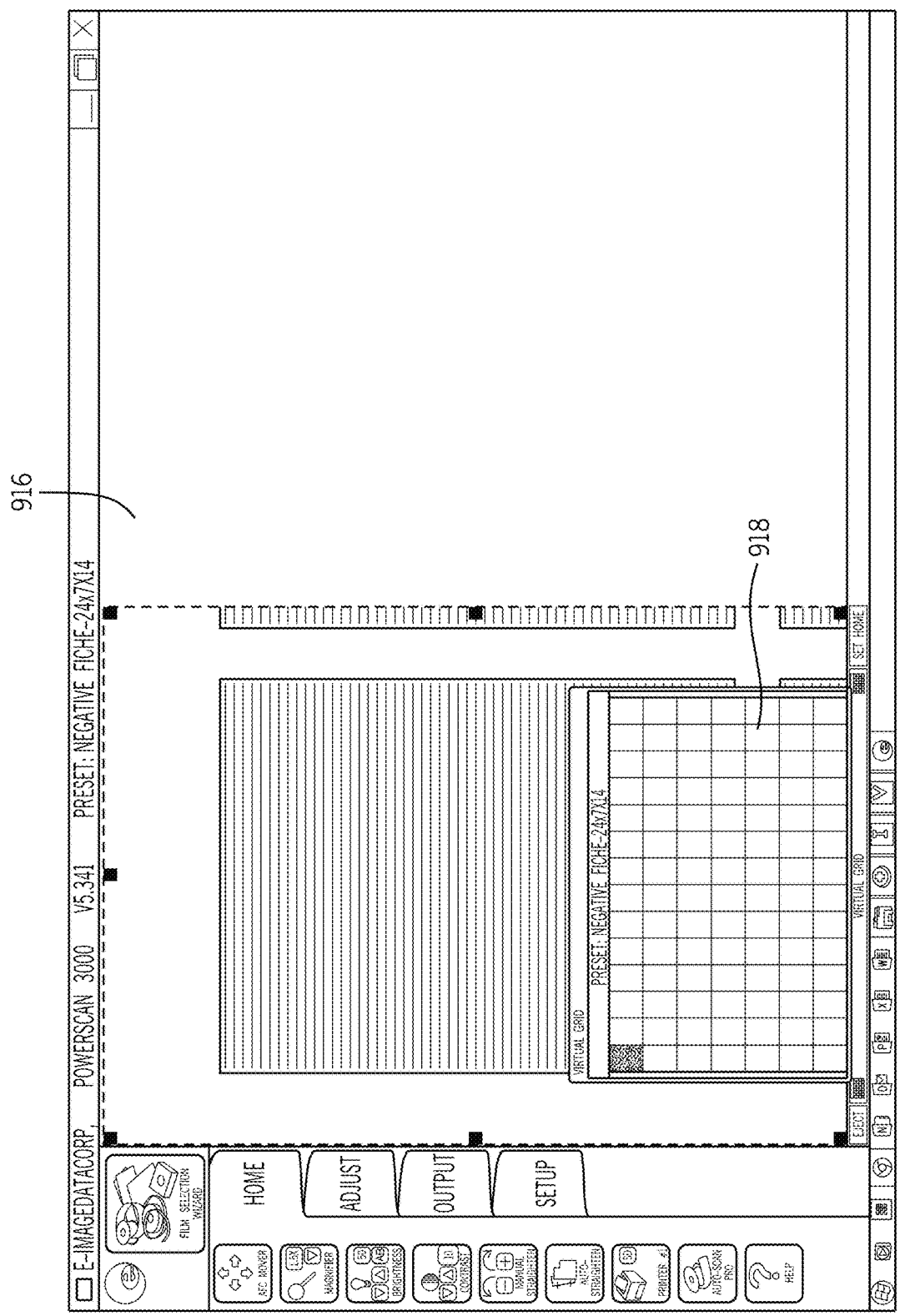
FIG. 25 is a screenshot of the computer user interface of FIG. 24 displaying a virtual grid.

Once the microform media is loaded onto the microform media support 44, a virtual grid 914 can be created at block 1004 to allow quick and precise navigation of the microform media. To create the virtual grid 914, the layout of the microform media can be determined. Preferably, each of the images on the microform media are approximately evenly spaced apart from one another. In some embodiments, a user is prompted by the computer user interface (e.g., CUI 910) to enter the number of rows and columns of images present on the microform media. In some examples, the columns are typically numbered, while the rows are assigned a letter. Alternatively, the sensor 97 can be used to detect the position and layout of the microform media. With the position and layout determined, the computer user interface 916 can display a grid 918, as shown in FIG. 25.

Figure 24:
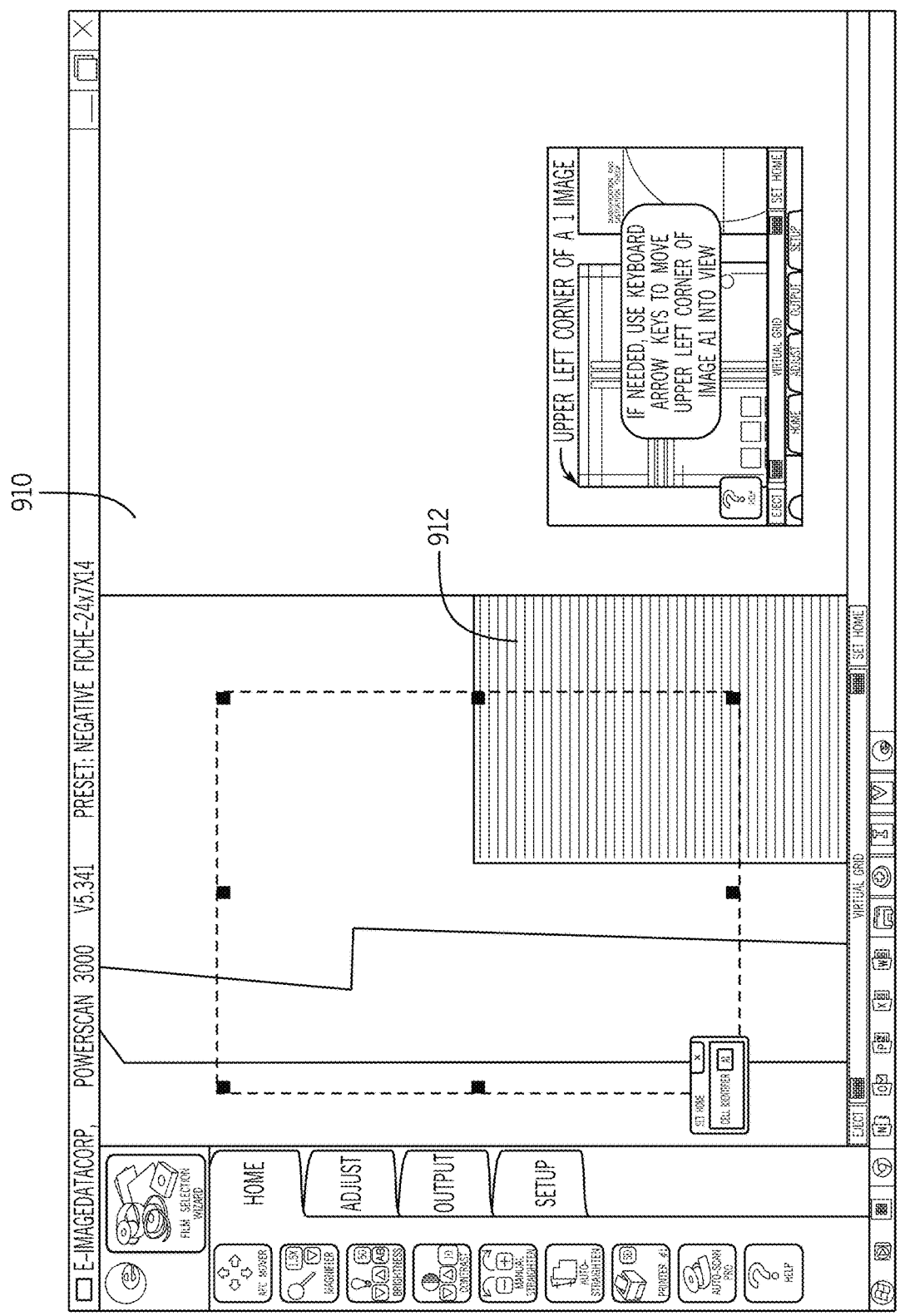
FIG. 24 is a screenshot of a third computer user interface that can be present in the digital microform imaging apparatus assembly of FIG. 13, displaying an image on a microform media loaded into the digital microform imaging apparatus.
Figure 26:
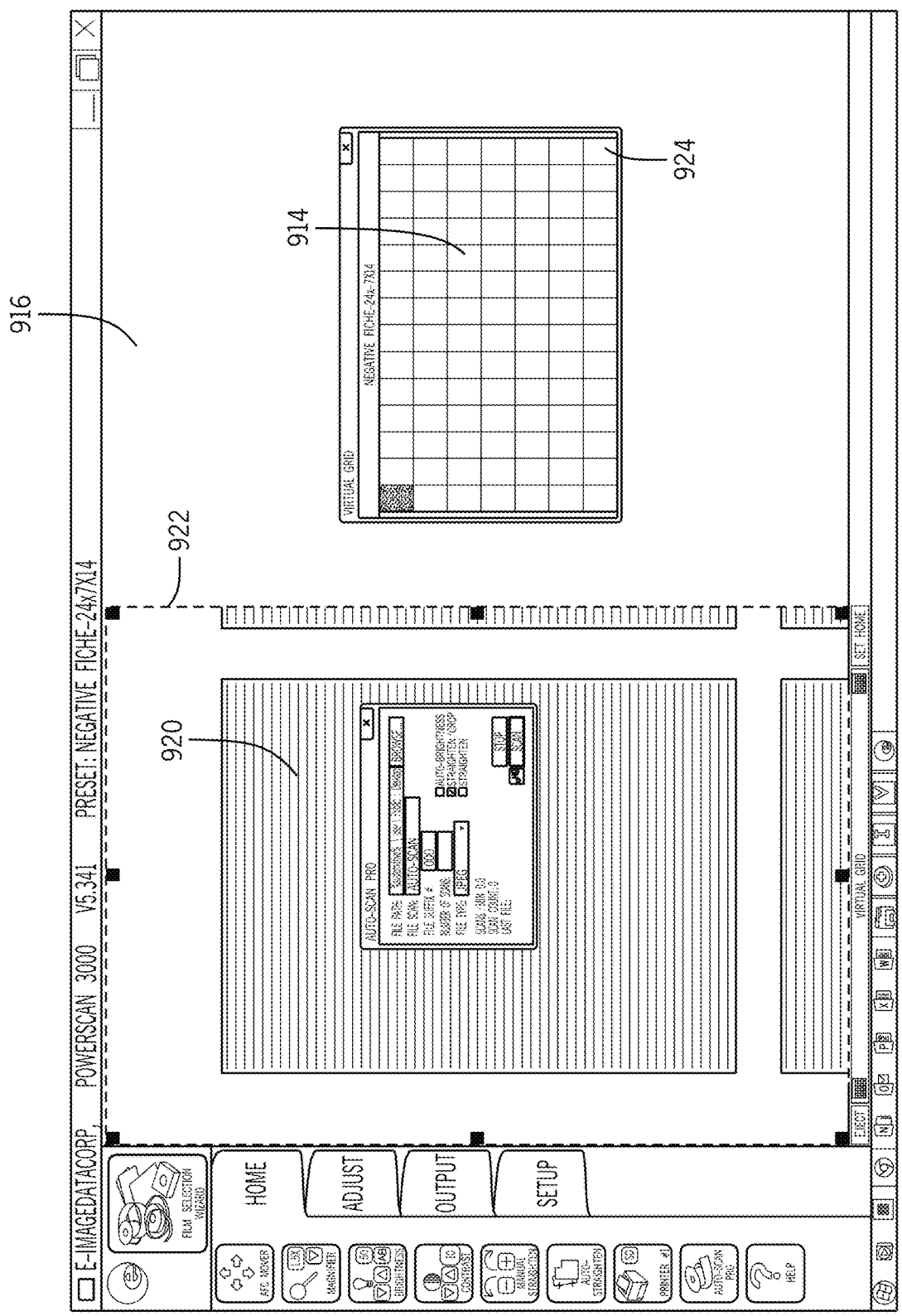
FIG. 26 is a screenshot of the computer user interface of FIG. 24 displaying a home position on the microform media.

In some embodiments, a user can then select "set home" from the computer user interface 916. The motorized microform transport device 800 then activates the motors 814, 816 to move the microform media support 44 to present the top, left image 920 in the array on the monitor 642, as shown in FIG. 26. Before the virtual grid 914 has been created, the image 920 on the microform may not be perfectly centered, as shown in FIG. 24. Again using the keyboard, joystick, or other input methods, the microform media support 44 can be moved until the image capture 922 on the CUI 916 is approximately centered over the image 920. Additionally or alternatively, a user can be prompted to select a "home"

position on the microform media. The home position can be the upper left corner of the upper left image 920 on the microform media.

Once the home position is established, a user can then select the lower-most and right-most image 924 on the microform media. This can be done manually or by selecting the corresponding segment on the virtual grid 914 displayed on the monitor 642. The motors 814, 816 activate to move the microform media support 44 to display, generally, the image present in that location of the virtual grid 914. Using the arrow keys on the keyboard, a joystick, or other input methods, a user can center the image 920, 924 within the image capture 922 on the CUI 916. The image capture 922 can be carefully cropped around the image using a mouse, for example, or alternatively automatically cropped around the image. Once the image capture 922 is carefully cropped around the lower right image in the microform media, a user can select "create grid" from the CUI 916. With the virtual grid 914 established and properly centered, a user can click any segment on the virtual grid 914 and the motorized microform transport device 800 will automatically drive the microform media support 44 to the appropriate position, where the selected image is displayed on the monitor 642.

Additionally, the motorized microform transport device 800 can return to a selected image, even if the microform media support 44 is manually moved away from a set position. When the microform media support 44 is moved manually, the motorized microform transport device 800 can first transport the microform media support 44 to the hard stops, thereby reestablishing those positions so the motors 814, 816 (and the computer controlling the motors 814, 816) have the appropriate reference point needed to return the microform media support 44 to the image selected on the virtual grid 914.

Figure 27:
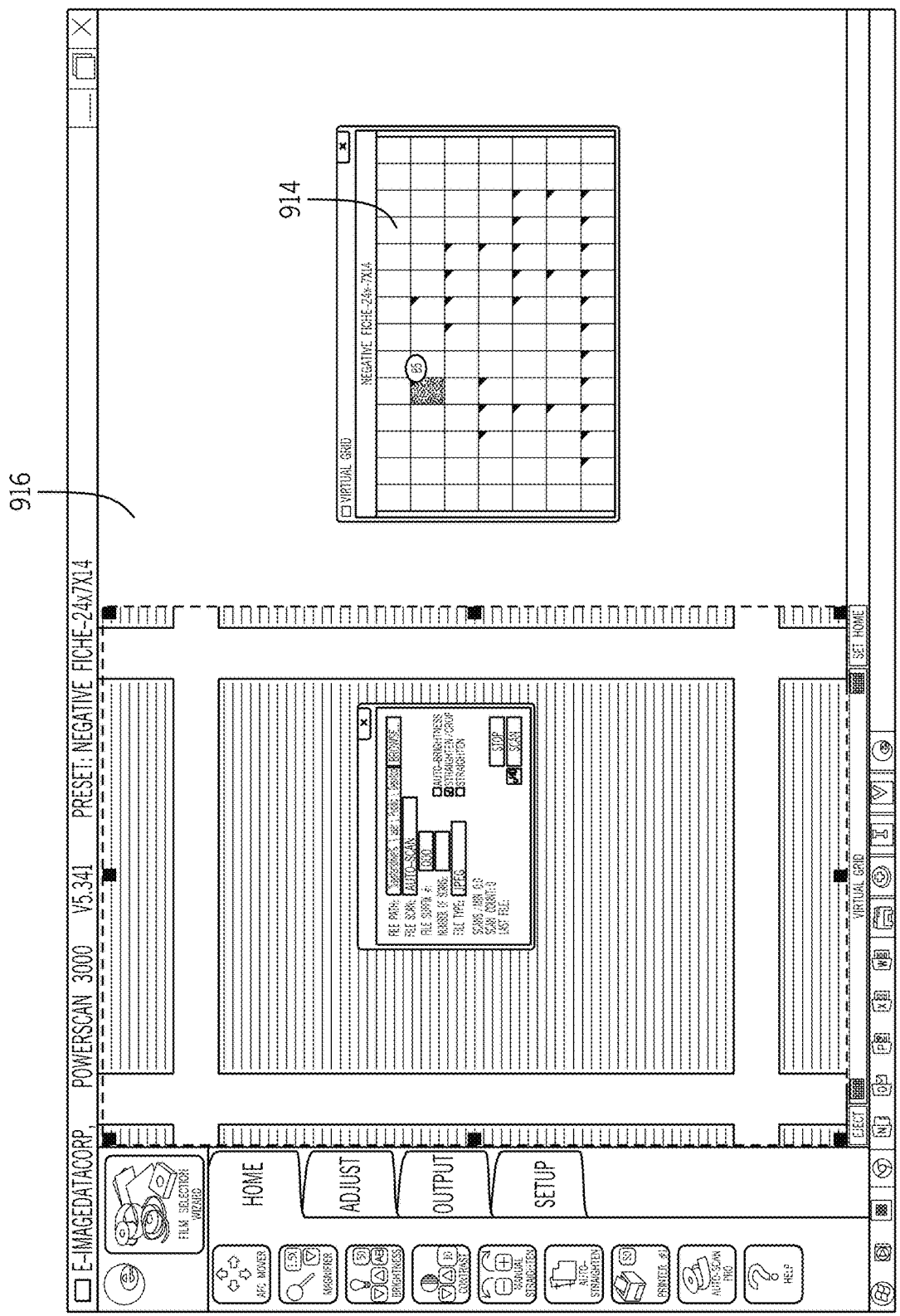
FIG. 27 is a screenshot of the computer user interface of FIG. 24 displaying an image on a microform media along with an auto-scan tool.

With the virtual grid 914 established, a user can select "auto-scan" on the CUI 916, which can quickly and automatically capture and archive each image on the microform media at block 1006. The precision and accuracy provided by the motors 814, 816, lead screw 820 and follower assembly 854, and gear rack assembly 846 can consistently and correctly locate each image on the microform media at speeds of 100 images per minute, or even greater. In some embodiments, variations of the auto-scan feature can be employed. For example, a user may wish to archive only some of the many images present on the microform media. Accordingly, a user can use the virtual grid 914 to select multiple images of interest from the microform media, as shown in FIG. 27. Once the images of interest are selected on the virtual grid 914, the motorized microform transport device 800 can activate to automatically drive the microform media support 44 to display and capture each of the targeted images, while skipping over the unselected images.

The motorized microform transport device 800 also includes safeguards to compensate for errors that may occur during typical use. For example, many users may be tempted to move the microform media support 44 manually to view other images on the loaded microform media. In an open-loop control system using stepper motors, manual movement of the microform media support would cause the motorized microform transport device 800 to fall out of calibration, as the number of steps taken by the motor no longer corresponds to the position of the microform media support 44, which may be monitored almost entirely this way. The computer 602 would not be able to determine how far or in what direction the microform media support 44 had been moved, which would be undesirable. To accommodate this type of potential error, the motorized microform transport device 800 can include sensors/monitors to detect back electromotive force (BEMF) within the motors. When the BEMF exceeds a certain, threshold amount, the computer 602 documents that a manual move of the microform media support 44 has taken place. The monitor 642 can display a message indicating to a user that these movements can be carried out electronically using the computer 602 and on-screen controls displayed on the monitor 642. If a user then selected a command to move the microform media support 44 electronically (e.g., by selecting an image on a virtual grid 914), the motors 814, 816 would be commanded to drive toward the hard stops to first reestablish a reference point before positioning the selected image beneath the area sensor 97 and upon the monitor 642.

Using various versions of the DMIA 22, 206, 214, 236 and the motorized microform transport device 800, all microforms of all types and varieties can be readily scanned, printed, or viewed by a user. The motorized microform transport device 800 provides a universal design that can be used as a scanner/reader/printer, as well as a microform conversion device for microfiche, roll film, and micro opaque cards.

Although the motorized microform transport device 800 has been described in the context of reading, scanning, and printing images from microfiche, the motorized microform transport device 800 is also useful in accessing images on roll film. For example, the motorized microform transport device 800 can maneuver the microform media support 44 to properly position the roll film within the optical path of the area sensor 97, which can allow individual images on the media to be scanned/read/printed. All needed positional adjustments can be controlled through the computer 602 without the need for a user to physically touch the DMIA 22, 206, 214, 236 or microform media. The motorized microform transport device 800 may prove particularly useful in cases where organizations do not want patrons handling a DMIA 22, 206, 214, 236 or microform media, like a library, for example.

The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of embodiments of the invention. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the invention. Various modifications, changes, and variations apparent to those skilled in the art may be made in the arrangement, operation, and details of the methods and systems of the present invention disclosed herein without departing from the scope of the claimed invention.

We claim:

1. A digital microform imaging apparatus, the apparatus comprising:
   a bracket movably coupled to a chassis;
   a microform media support coupled to the bracket and including a frame and a window supported by the frame;
   an illumination source to direct light through the window of the microform media support along an optical axis;
   an optical sensor positioned along the optical axis; and
   a motor operatively engaged with the microform media support to move the bracket and frame relative to the chassis along an axis perpendicular to the optical axis.

2. The apparatus of claim 1, wherein the motor is coupled to a carriage, the carriage being movable relative to the chassis to move the microform media support.

3. The apparatus of claim 2, wherein the carriage is movable relative to the chassis by a gear rack assembly.

4. The apparatus of claim 3, wherein a second motor is coupled to the carriage and is configured to drive a gear in operative engagement with the gear rack assembly to move the carriage.

5. The apparatus of claim 4, wherein the second motor and the first motor have parallel axes of rotation.

6. The apparatus of claim 4, wherein a roller is received within the carriage and is configured to roll about an axis approximately parallel to a rotational axis of the gear.

7. The apparatus of claim 1, wherein the motor has an output shaft and a pulley coupled to the output shaft.

8. The apparatus of claim 7, wherein the pulley coupled to the output shaft has teeth.

9. The apparatus of claim 7, wherein the pulley receives and drives a belt operatively coupled to a lead screw, the lead screw being threadably coupled to the microform media support to drive the microform media support along an axis perpendicular to the optical axis.

10. The apparatus of claim 9, wherein the lead screw is coupled to a follower assembly positioned beneath the microform media support.

11. The apparatus of claim 10, wherein the follower assembly comprises two lead screw nuts spaced apart from one another and threaded onto the lead screw.

12. The apparatus of claim 11, wherein the two lead screw nuts are assembled into a holder.

13. The apparatus of claim 12, wherein a compression spring biases the lead screw nuts away from one another.

14. The apparatus of claim 12, wherein the holder is coupled to the microform media support using a two-sided adhesive tape.

15. The apparatus of claim 12, wherein each of the two lead screw nuts has less than one complete internal thread.

16. The apparatus of claim 15, wherein each of the lead screw nuts is identical.

17. The apparatus of claim 16, wherein the lead screw nuts are formed of a lubricous plastic.

18. The apparatus of claim 9, wherein the lead screw is a molded polymeric component.

19. A digital microform imaging apparatus, the apparatus comprising:
   a microform media support having a window extending perpendicular to an optical axis defined by an illumination source, the microform media support being axially movable in at least two directions perpendicular to the optical axis,
   wherein the microform media support is operatively coupled to a first motor and a second motor, the first motor and the second motor configured to move the microform media support axially in the at least two directions perpendicular to the optical axis.

20. The apparatus of claim 19, wherein the first motor drives a timing belt operatively coupled to a lead screw.

21. The apparatus of claim 20, wherein the lead screw is threadably coupled to the microform media support and configured to drive the microform media support along a longitudinal axis of the lead screw.

22. The apparatus of claim 21, wherein the lead screw is coupled to a follower assembly positioned beneath the microform media support.

23. The apparatus of claim 22, wherein the follower assembly comprises two lead screw nuts spaced apart from one another and threaded onto the lead screw.

24. The apparatus of claim 23, wherein the two lead screw nuts are assembled into a holder.

25. The apparatus of claim 23, wherein a compression spring biases the lead screw nuts away from one another.

26. The apparatus of claim 24, wherein the holder is coupled to the microform media support using a two-sided adhesive tape.

27. The apparatus of claim 24, wherein each of the two lead screw nuts has less than one complete internal thread.

28. The apparatus of claim 27, wherein each of the lead screw nuts is identical.

29. The apparatus of claim 28, wherein the lead screw nuts are formed of a lubricous plastic.

30. The apparatus of claim 20, wherein the lead screw is a molded polymeric component.

31. The apparatus of claim 19, wherein the second motor drives a timing belt operatively coupled to a gear.

32. The apparatus of claim 31, wherein the gear is engaged with a gear rack assembly coupled to a chassis of the digital microform imaging apparatus.

33. The apparatus of claim 32, wherein first motor and second motor are coupled to a carriage supported by the gear and configured to move along the gear rack assembly.

34. The apparatus of claim 33, wherein the carriage is received within a housing removably coupled to a bracket that is movably coupled to the chassis.

35. The apparatus of claim 34, wherein the housing is fastened to the bracket.

36. The apparatus of claim 19, wherein the first motor and the second motor are in electrical communication with a computer and/or a monitor.

37. A digital microform imaging apparatus, the apparatus comprising:
   an illumination source;
   an optical sensor; and
   a motorized microform transport device coupled to a microform media support, the motorized microform transport device comprising:
   a housing defining a cavity,
   a carriage received within the cavity,
   a first motor coupled to the carriage and operatively coupled to a lead screw to rotate the lead screw about a longitudinal axis and drive the microform media support along an axis parallel to the longitudinal axis, and
   a second motor coupled to the carriage and operatively coupled to a gear within the cavity, wherein the gear is configured to drive the carriage relative to the digital microform imaging apparatus in a direction perpendicular to the longitudinal axis.

38. The apparatus of claim 37, wherein the first motor drives a timing belt operatively coupled to the lead screw.

39. The apparatus of claim 38, wherein the lead screw is threadably coupled to the microform media support.

40. The apparatus of claim 39, wherein the lead screw is coupled to a follower assembly positioned beneath the microform media support.

41. The apparatus of claim 40, wherein the follower assembly comprises two lead screw nuts spaced apart from one another and threaded onto the lead screw.

42. The apparatus of claim 41, wherein the two lead screw nuts are assembled into a holder.

43. The apparatus of claim 42, wherein a compression spring biases the lead screw nuts away from one another.

44. The apparatus of claim 42, wherein the holder is coupled to the microform media support using a two-sided adhesive tape.

45. The apparatus of claim 42, wherein each of the two lead screw nuts has less than one complete internal thread.

46. The apparatus of claim 45, wherein each of the lead screw nuts is identical.

47. The apparatus of claim 42, wherein the lead screw nuts are formed of a lubricous plastic.

48. The apparatus of claim 37, wherein the lead screw is a molded polymeric component.

49. The apparatus of claim 37, wherein the second motor drives a belt operatively coupled to the gear.

50. The apparatus of claim 49, wherein the gear is engaged with a gear rack assembly coupled to a chassis of the digital microform imaging apparatus.

51. The apparatus of claim 50, wherein the carriage is supported by the gear and is configured to move along the gear rack assembly.

52. The apparatus of claim 50, wherein the housing is fastened to a bracket, the bracket being movably coupled to the chassis.

53. The apparatus of claim 37, wherein the first motor and the second motor are in electrical communication with a computer and/or a monitor.

54. A motorized microform transport device for a digital microform imaging apparatus, the device comprising:
   a housing defining a cavity;
   a carriage received within the cavity;
   a first motor coupled to the carriage and operatively coupled to a lead screw to rotate the lead screw about a longitudinal axis; and
   a second motor coupled to the carriage and operatively coupled to a gear within the cavity, the gear being configured to drive the housing relative to the digital microform imaging apparatus in a direction perpendicular to the longitudinal axis.

55. The device of claim 54, wherein the first motor drives a belt operatively coupled to the lead screw.

56. The device of claim 55, wherein the lead screw is threadably coupled to a microform media support.

57. The device of claim 56, wherein the lead screw is coupled to a follower assembly positioned beneath the microform media support.

58. The device of claim 57, wherein the follower assembly comprises two lead screw nuts spaced apart from one another and threaded onto the lead screw.

59. The device of claim 58, wherein the two lead screw nuts are assembled into a holder.

60. The device of claim 58, wherein a compression spring biases the lead screw nuts away from one another.

61. The device of claim 58, wherein the holder is coupled to the microform media support using a two-sided adhesive tape.

62. The device of claim 58, wherein each of the two lead screw nuts has less than one complete internal thread.

63. The device of claim 62, wherein each of the lead screw nuts is identical.

64. The device of claim 54, wherein the lead screw nuts are formed of a lubricous plastic.

65. The device of claim 54, wherein the lead screw is a molded polymeric component.

66. The device of claim 54, wherein the second motor drives a belt operatively coupled to the gear.

67. The device of claim 66, wherein the gear is engaged with a gear rack assembly coupled to a chassis of the digital microform imaging apparatus.

68. The device of claim 67, wherein the carriage is supported by the gear and is configured to move along the gear rack assembly.

69. The device of claim 67, wherein the housing is fastened to a bracket coupled a microform media support, the bracket being movably coupled to the chassis.

70. The device of claim 54, wherein the first motor and the second motor are in electrical communication with a computer.

71. The device of claim 54, further comprising a follower assembly coupled to a microform media support.

72. The device of claim 71, wherein the microform media support includes a top glass plate and a bottom glass plate spaced apparatus from one another to receive and secure microform.

73. The device of claim 72, wherein the top glass plate is rotatably movable relative to the bottom glass plate.

74. The device of claim 72, wherein a spacer is positioned between the upper glass plate and the lower glass plate.

75. The device of claim 74, wherein the spacer is tape.

76. The device of claim 54, wherein the first motor and the second motor are stepper motors.

77. The device of claim 54, further comprising an encoder movable with the carriage.

78. The device of claim 54, further comprising stall circuitry connected to each of the first motor and the second motor to detect a stall condition.

79. The device of claim 54, further comprising optical sensors to detect a position of the carriage within the housing.

80. The device of claim 54, wherein the first motor and second motor are servo motors.

81. The device of claim 54, wherein the gear is formed of a polymeric material.

* * * * *